United States Patent
Ono et al.

(10) Patent No.: US 7,304,708 B2
(45) Date of Patent: Dec. 4, 2007

(54) LIQUID CRYSTAL DISPLAY DEVICE AND IMAGE DISPLAY DEVICE

(75) Inventors: Kikuo Ono, Mobara (JP); Takahiro Ochiai, Mobara (JP); Ryutaro Oke, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/503,977

(22) Filed: Aug. 15, 2006

(65) Prior Publication Data
US 2006/0274250 A1 Dec. 7, 2006

Related U.S. Application Data

(62) Division of application No. 10/310,915, filed on Dec. 6, 2002, now abandoned.

(30) Foreign Application Priority Data
Jan. 17, 2002 (JP) ............................. 2002-008283

(51) Int. Cl.
*G02F 1/1343* (2006.01)
(52) U.S. Cl. .................... 349/141; 349/38; 349/143
(58) Field of Classification Search ................. 349/141, 349/143, 147, 38, 39
See application file for complete search history.

(56) References Cited

U.S. PATENT DOCUMENTS 5,852,485 A  12/1998 Shimada et al.
6,118,508 A  9/2000 Park
6,177,970 B1  1/2001 Kim
6,600,541 B2  7/2003 Kurahashi et al.
6,621,546 B2  9/2003 Yang et al.
6,661,492 B2  12/2003 Kim
6,697,141 B2  2/2004 Yamakita et al.
6,897,909 B2 * 5/2005 Ochiai et al. .................. 349/43
2002/0131005 A1  9/2002 Yang

FOREIGN PATENT DOCUMENTS

| JP | 07-036058 | 7/1993 |
| JP | 09-230378 | 2/1996 |
| JP | 10-301141 | 4/1997 |
| JP | 11-125840 | 10/1997 |

\* cited by examiner

*Primary Examiner*—Thoi V. Duong
(74) *Attorney, Agent, or Firm*—Reed Smith LLP; Stanley P. Fisher, Esq.; Juan Carlos A. Marquez, Esq.

(57) ABSTRACT

A liquid crystal display device includes at least a common electrode line, a common electrode and a pixel electrode in each pixels, the common electrode line comprising a first common electrode line which extends in the extending direction of the gate lines and a second common electrode line which extends in the extending direction of the drain lines in the pixel region, the first common electrode line and the second common electrode line are spaced apart from each other by way of a first insulating film, the first common electrode line and the second common electrode line are connected via an opening portion formed in the first insulating film, and a second insulating film is formed over the opening portion.

4 Claims, 17 Drawing Sheets

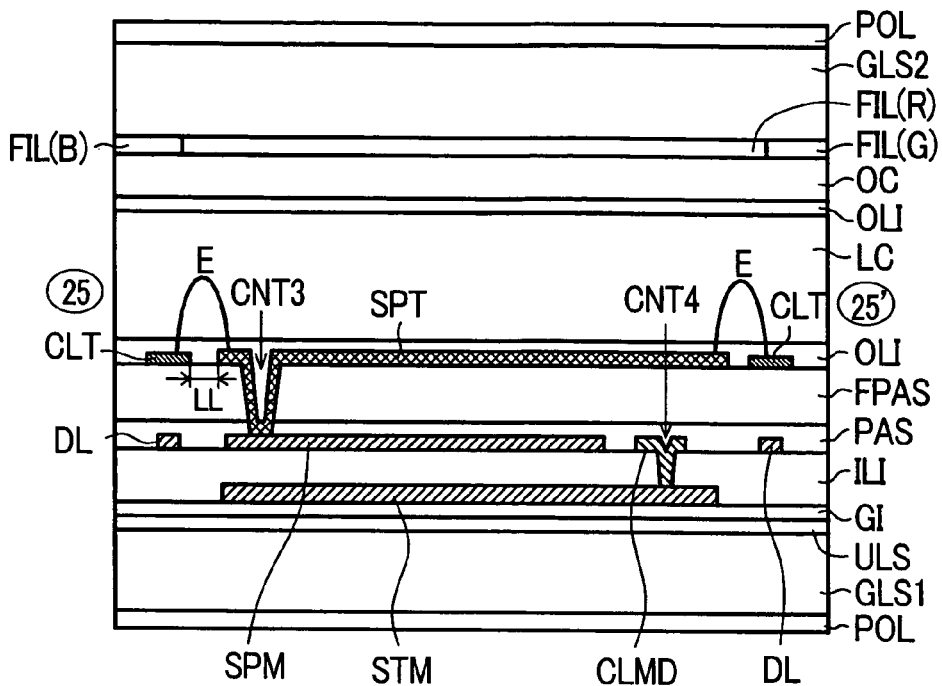
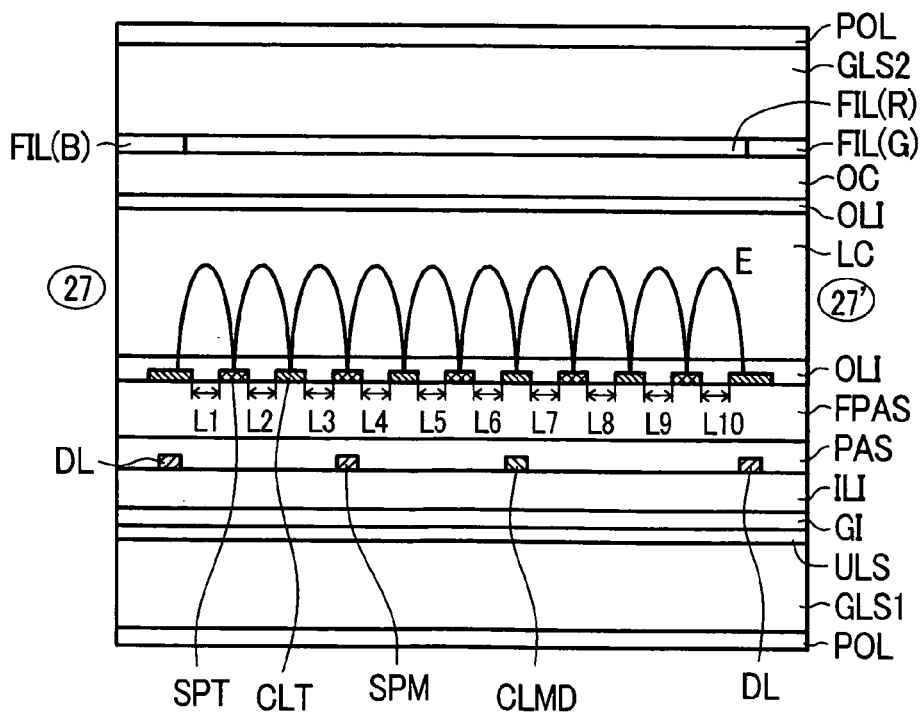

LIQUID CRYSTAL DISPLAY DEVICE AND IMAGE DISPLAY DEVICE

CROSS-REFERENCE TO RELATED APPLICATION

This application is a Divisional application of U.S. application Ser. No. 10/310,915 filed Dec. 6, 2002, now abandoned. Priority is claimed based on U.S. application Ser. No. 10/310,915 filed Dec. 6, 2002, which claims the priority of Japanese Patent Application No. 2002-0082.83 filed Jan. 17, 2002, all of which is incorporated by reference.

BACKGROUND OF THE INVENTION

1. Field of the Invention

The present invention relates to a image display device and liquid crystal display device, and more particularly to an active matrix liquid crystal display device of a thin film transistor (hereinafter referred to as "TFT") type or the like and a manufacturing method thereof.

2. Description of the Related Art

An IPS mode liquid crystal display device has been known for adopting a method for realizing a wide viewing angle in Japanese Laid-open Patent Publication 36058/1995 and the like. Further, a method which arranges pixel electrodes and a common electrode on an organic resin via through holes formed in the resin has been proposed in Japanese Laid-open Patent Publication 230378/1997. Further, as active elements which perform switching, thin film transistors (hereinafter referred to as TFTs) using polysilicon have been known other than TFTs using amorphous silicon.

SUMMARY OF INVENTION

The IPS type liquid crystal display device has a drawback that the numerical aperture is lower than that of a TN type liquid crystal display device and hence, the improvement of the numerical aperture has been a task of the IPS type liquid crystal display device heretofore. Further, to cope with a demand for video digital media including a large-sized liquid crystal television set, there has been a task that the high luminance must be realized and a further uniform display must be realized by reducing the influence of wiring delay in a liquid crystal display device having a large-sized screen.

Further, when a screen size of the liquid crystal display device adopting the IPS display method is large-sized and the resolution requires the high definition, there arises a drawback that the luminance irregularities, the smear or the like is worsened and hence, the image quality is degraded. In the IPS type display device using an active matrix type driving, liquid crystal is driven by a lateral electric field applied between a pixel electrode and a common electrode of each pixel. Since the pixel electrode is independently driven at every pixel, the delay time of each pixel is determined based on a driving ability with respect to a sum of the liquid crystal capacitance of the pixel TFT and the holding capacitance. In the IPS type display device, a value of the liquid crystal capacitance is small and a value of the holding capacitance is large compared to those of the TN type display device. On the other hand, the common electrode is formed of lines connected in the screen and wiring delay with respect to the resistivity of the electrode material and a load of the capacitance value with other lines causes a delay time which deteriorates the image quality. To review each pixel, the holding capacitance is the largest factor which causes the wiring delay. Accordingly, inventors of the present invention have found that the necessity to decrease the wiring delay time of the common electrode is particularly effective to enhance the image quality.

Further, the inventors have also found that to reduce the number of driving ICs arranged outside by incorporating a circuit for driving drain lines into a TFT substrate made of glass or the like, it is necessary to decrease the wiring delay of the drain lines. Accordingly, the liquid crystal display device has to cope with a task that the drain line capacitance must be reduced.

It is one advantage of the present invention to realize an IPS type liquid crystal display device which can realize the enhancement of numerical aperture. It is another advantage of the present invention to realize an IPS type liquid crystal display device which can realize the high luminance. It is still another advantage of the present invention to realize a liquid crystal display device which can reduce the influence of wiring delay and can improve the image quality even when the liquid crystal display device has a large screen.

Other advantages of the present invention will become apparent through the specification of the present application.

To describe main constitutional examples of the present invention, they are as follows.

(1)

In a liquid crystal display device having a liquid crystal layer and a color filter layer sandwiched between a first transparent substrate and a second transparent substrate, having a plurality of gate lines, a plurality of drain lines which cross the plurality of gate lines in a matrix array and thin film transistors formed corresponding to respective crossing points of the gate lines and the drain lines on the first substrate, constituting pixel regions from regions each of which is surrounded by the neighboring gate lines and the neighboring drain lines, wherein each pixel includes at least a common electrode line, a common electrode and a pixel electrode, the common electrode line comprising a first common electrode line which extends in the extending direction of the gate lines and a second common electrode line which extends in the extending direction of the drain lines in the pixel region, the first common electrode line and the second common electrode line are spaced apart from each other by way of a first insulating film, the first common electrode line and the second common electrode line are connected via an opening portion formed in the first insulating film, and a second insulating film is formed over the opening portion.

(2)

In the above-mentioned means (1), the first common electrode line and the second common electrode line include at least the second insulating film between the common electrode and the first and second common electrode lines in the pixel region, and the common electrode includes a portion which is arranged over the drain line by way of at least the second insulating film such that the portion has a width larger than a width of the drain line.

(3)

In a liquid crystal display device having a liquid crystal layer and a color filter layer sandwiched between a first transparent substrate and a second transparent substrate, having a plurality of gate lines, a plurality of drain lines which cross the plurality of gate lines in a matrix array and thin film transistors formed corresponding to respective crossing points of the gate lines and the drain lines on the first substrate, constituting pixel regions from regions each of which is surrounded by the neighboring gate lines and the neighboring drain lines, wherein each pixel includes at least a common electrode line and a pixel electrode, the liquid crystal display device comprising a first island-like electrode in the pixel region, an opening portion formed in a first insulating film which covers the first island-like electrode, a common electrode line which extends in the extending direction of the drain lines, wherein the first island-like electrode and the common electrode line are connected via the opening portion, the first island-like electrode constitutes a lower electrode, and a second island-like electrode which is connected to a source of the thin film transistor and is formed on the first insulating film constitutes an upper electrode thus forming holding capacitance.

(4)

In the means (3), the liquid crystal display device includes the common electrodes which are formed over an insulating film which covers the drain line over the first substrate, the common electrodes are connected in a matrix array between neighboring pixels, and the common electrodes include portions which have a width wider than a width of the drain lines over an insulating film which are applied onto the drain lines.

(5)

In the means (3), the insulating film of the holding capacitance is an inorganic insulating film which covers the gate line of the thin film transistor.

(6)

In the means (3), the first island-like electrode is constituted of a semiconductor layer of the thin film transistor and the insulating film of the holding capacitance includes at least a gate insulating film of the thin film transistor.

(7)

In a liquid crystal display device having a liquid crystal layer and a color filter layer sandwiched between a first substrate and a second substrate, having a plurality of gate lines, a plurality of drain lines which cross the plurality of gate lines in a matrix array and thin film transistors formed corresponding to respective crossing points of the gate lines and the drain lines on the first substrate, constituting pixel regions from regions each of which is surrounded by the neighboring gate lines and the neighboring drain lines, wherein each pixel includes at least a common electrode line, a common electrode and a pixel electrode, the liquid crystal display device comprising a common electrode line which extends in the extending direction of the drain line as the common electrode line, an island-like metal pixel electrode which is connected to a source of the thin film transistor, wherein the pixel region includes an opening portion which is divided into 6 or more opening portions between the neighboring drain lines, at least 1 divided opening portion is arranged between the island-like metal pixel electrode and one of the neighboring drain lines, at least 2 divided opening portions are arranged between the common electrode line and the other of the neighboring drain lines, and at least 3 divided opening portions are arranged between the island-like metal pixel electrode and the common electrode line.

(8)

In a liquid crystal display device having a liquid crystal layer and a color filter layer sandwiched between a first substrate and a second substrate, having a plurality of gate lines, a plurality of drain lines which cross the plurality of gate lines in a matrix array and thin film transistors formed corresponding to respective crossing points of the gate lines and the drain lines on the first substrate, constituting pixel regions from regions each of which is surrounded by the neighboring gate lines and the neighboring drain lines, wherein each pixel includes at least a common electrode line, a common electrode and a pixel electrode, the liquid crystal display device comprising a common electrode line which extends in the extending direction of the drain line as the common electrode line, an island-like metal pixel electrode which is connected to a source of the thin film transistor, wherein the pixel region includes an opening portion which is divided into 8 or more opening portions between the neighboring drain lines, at least 3 divided opening portions are arranged between the island-like metal pixel electrode and one of the neighboring drain lines, at least 2 divided opening portions are arranged between the common electrode line and the other of the neighboring drain lines, and at least 3 divided opening portions are arranged between the island-like metal pixel electrode and the common electrode line.

(9)

In a liquid crystal display device having a liquid crystal layer and a color filter layer sandwiched between a first substrate and a second substrate, having a plurality of gate lines, a plurality of drain lines which cross the plurality of gate lines in a matrix array and thin film transistors formed corresponding to respective crossing points of the gate lines and the drain lines on the first substrate, constituting pixel regions from regions each of which is surrounded by the neighboring gate lines and the neighboring drain lines, wherein each pixel includes at least a common electrode line, a transparent common electrode and a transparent pixel electrode, the transparent common electrode and the transparent pixel electrode are formed on a same layer above the drain lines, the liquid crystal display device includes a common electrode line which extends in the extending direction of the drain line as the common electrode line, a metal pixel electrode which is connected to a source of the thin film transistor, wherein the pixel region includes an opening portion which is divided into 6 or more opening portions between the neighboring drain lines, the metal pixel electrode is arranged below the transparent pixel electrode which is closest to one drain line of the neighboring drain lines, the common electrode line is arranged close to the other drain line of the neighboring drain lines and below the transparent common electrode which is not arranged on the other drain line, and at least 1 or more transparent common electrode or 1 or more transparent pixel electrodes are arranged between the metal pixel electrode and the common electrode line.

(10)

In a liquid crystal display device having a liquid crystal layer and a color filter layer sandwiched between a first substrate and a second substrate, having a plurality of gate lines, a plurality of drain lines which cross the plurality of gate lines in a matrix array and thin film transistors formed corresponding to respective crossing points of the gate lines and the drain lines on the first substrate, constituting pixel regions from regions each of which is surrounded by the neighboring gate lines and the neighboring drain lines, wherein each pixel includes at least a common electrode line, a common electrode and a pixel electrode, the liquid crystal display device comprising a metal pixel electrode which is arranged in a region sandwiched by the neighboring drain lines, a common electrode which extends in the extending direction of the drain line as the common electrode, and a distance between one of the neighboring drain lines and the metal pixel electrode, a distance between the metal pixel electrode and the common electrode and a distance between the common electrode and the other of the neighboring drain lines are set to approximately equal with respect to the number of division of the pixel region.

(11)

In any one of means (7) to (10), the liquid crystal display device includes a first common electrode line which extends in the extending direction of the gate lines and a second common electrode line which extends in the extending direction of the drain line as the common electrode line, and the first common electrode line and the second common electrode line are connected to each other via an opening portion of an insulating film in the pixel region.

(12)

In the means (10), the approximately equal distances with respect to the number of division of the pixel region are set to 3+3+2 in the liquid crystal display device in which the number of division of the region between the neighboring drain signal lines is 8, are set to 3+3+4 in the liquid crystal display device in which the number of division of the region between the neighboring drain signal lines is 10, and are set to 5+4+3 in the liquid crystal display device in which the number of division of the region between the neighboring drain signal lines is 12.

(13)

In a liquid crystal display device having a liquid crystal layer and a color filter layer sandwiched between a first transparent substrate and a second transparent substrate, having a plurality of gate lines, a plurality of drain lines which cross the plurality of gate lines in a matrix array and thin film transistors formed corresponding to respective crossing points of the gate lines and the drain lines on the first substrate, constituting pixel regions from regions each of which is surrounded by the neighboring gate lines and the neighboring drain lines, wherein each pixel includes at least a holding capacitance line and a pixel electrode, the liquid crystal display device comprising a first island-like electrode in the pixel region, an opening portion formed in a first insulating film which covers the first island-like electrode, a holding capacitance line which extends in the extending direction of the drain lines, wherein the first island-like electrode and the holding capacitance line are connected via the opening portion, the first island-like electrode constitutes a lower electrode, and a second island-like electrode which is connected to a source of the thin film transistor and is formed on the first insulating film constitutes an upper electrode thus forming holding capacitance between the first and second island-like electrodes.

(14)

In the means (13), the liquid crystal display device includes a second holding capacitance line which extends in the extending direction of the gate lines, and the second holding capacitance line and the holding capacitance line which extends in the extending direction of the drain lines are electrically connected via a through hole formed in the first insulating film.

(15)

In the means (13), the liquid crystal display device includes a second holding capacitance line which extends in the extending direction of the gate lines and the second holding capacitance line also functions as the first island-like electrode.

(16)

In a liquid crystal display device having a liquid crystal layer and a color filter layer sandwiched between a first transparent substrate and a second transparent substrate, having a plurality of gate lines, a plurality of drain lines which cross the plurality of gate lines in a matrix array and thin film transistors formed corresponding to respective crossing points of the gate lines and the drain lines on the first substrate, constituting pixel regions from regions each of which is surrounded by the neighboring gate lines and the neighboring drain lines, wherein each pixel includes a common electrode line, a transparent common electrode and a pixel electrode, an insulating film is formed over the gate line, the transparent common electrode is formed over the insulating film and has a region which covers the insulating film and has a width which is larger than a width of the gate line, and the transparent electrode line having the width wider than the width of the gate line plays a role of a black matrix in the liquid crystal display device.

(17)

In the means (16), the transparent electrode line having the width wider than the width of the gate line also covers a semiconductor layer of the thin film transistor.

(18)

In the means (16), the insulating film is an organic insulating film made of acrylic resin or the like.

(19)

In any one of the means (1), (2), (4), (7), (8), (9), (10) and (12), the common electrode and the pixel electrodes are formed of a transparent electrode and both electrodes are formed as an uppermost layer of the first substrate below an orientation film.

(20)

In either any one of the means (1) to (10) or any one of the means (12) to (18), the liquid crystal display device is a lateral electric field type liquid crystal display device.

(21)

In either any one of the means (1) to (10) or any one of the means (12) to (18), a semiconductor layer of the thin film transistor is formed of polysilicon.

(22)

An image display device which is used as a liquid crystal television set is constituted using an active matrix type liquid crystal display device adopting either any one of the means (1) to (10) or any one of the means (12) to (18).

(23)

An image display device which is used as a liquid crystal monitor is constituted using an active matrix type liquid crystal display device adopting either any one of the means (1) to (10) or any one of the means (12) to (18).

(24)

An image display device which is used as an integral type personal computer is constituted using an active matrix type liquid crystal display device adopting either any one of the means (1) to (10) or any one of the means (12) to (18).

Further constitutional examples of the present invention will be apparent in the specification of the present application which includes claims.

BRIEF DESCRIPTION OF THE DRAWINGS

FIG. 25 is a cross-sectional view of an essential part taken along a line 25-25' in FIG. 24.

FIG. 27 is a cross-sectional view of an essential part taken along a line 27-27' in FIG. 26.

DETAILED DESCRIPTION

Typical structures which constitute features of the present invention are explained hereinafter in conjunction with following embodiments.

Embodiment 1

Figure 1:
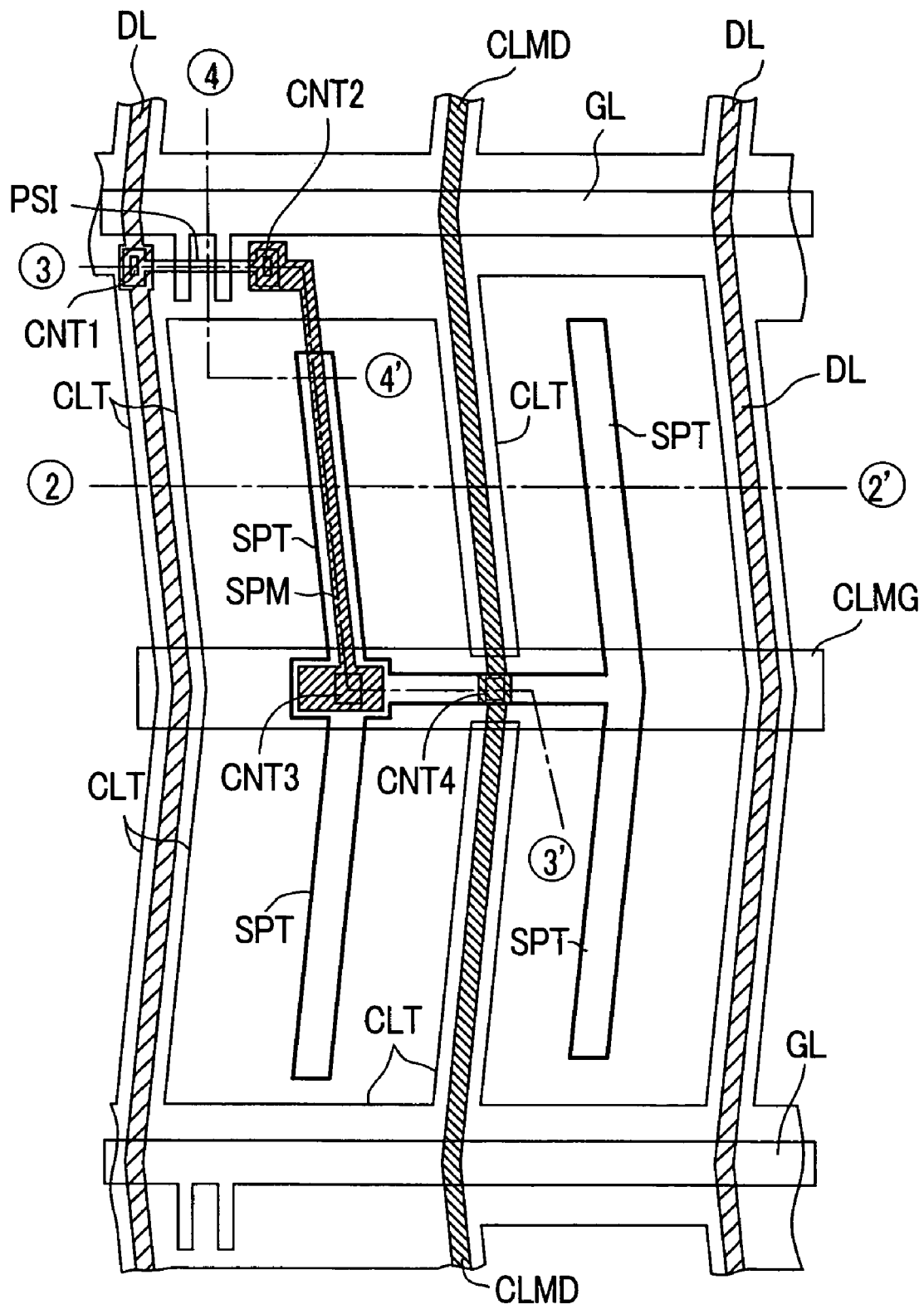
FIG. 1 is a plan view of an essential part of a pixel of a TFT liquid crystal display device according to one embodiment of the present invention.
Figure 2:
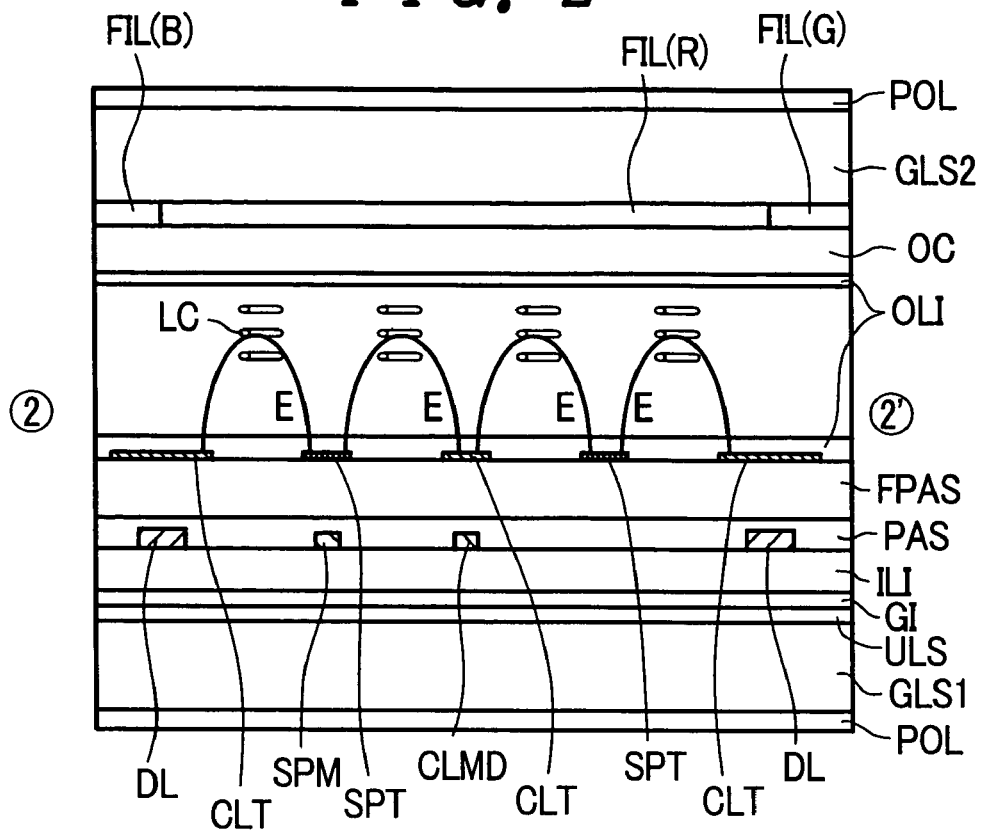
FIG. 2 is a cross-sectional view of an essential part of a pixel taken along a line 2-2' in FIG. 1.
Figure 3:
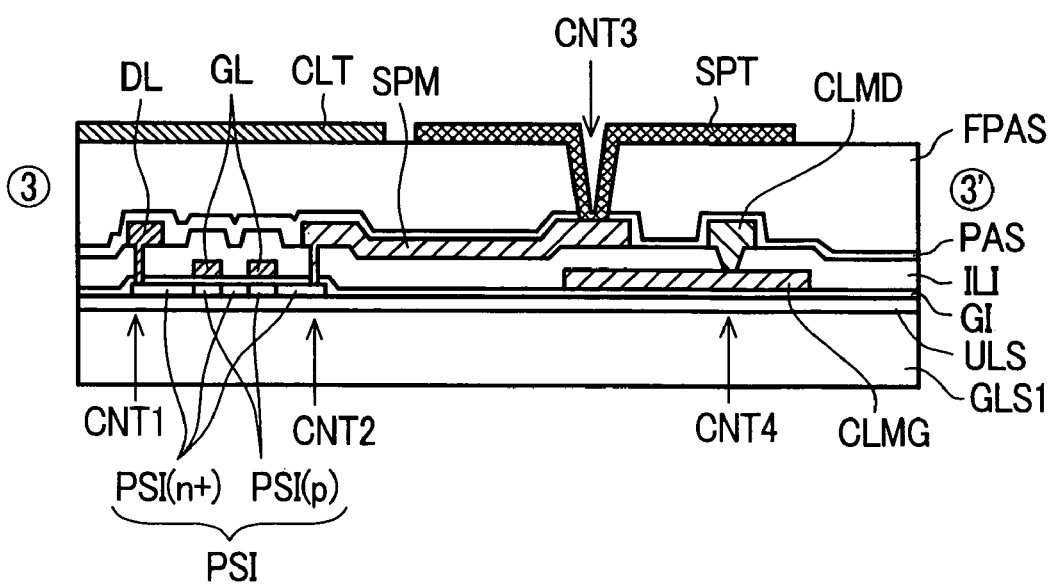
FIG. 3 is a cross-sectional view of an essential part of a pixel taken along a line 3-3' in FIG. 1.
Figure 4:
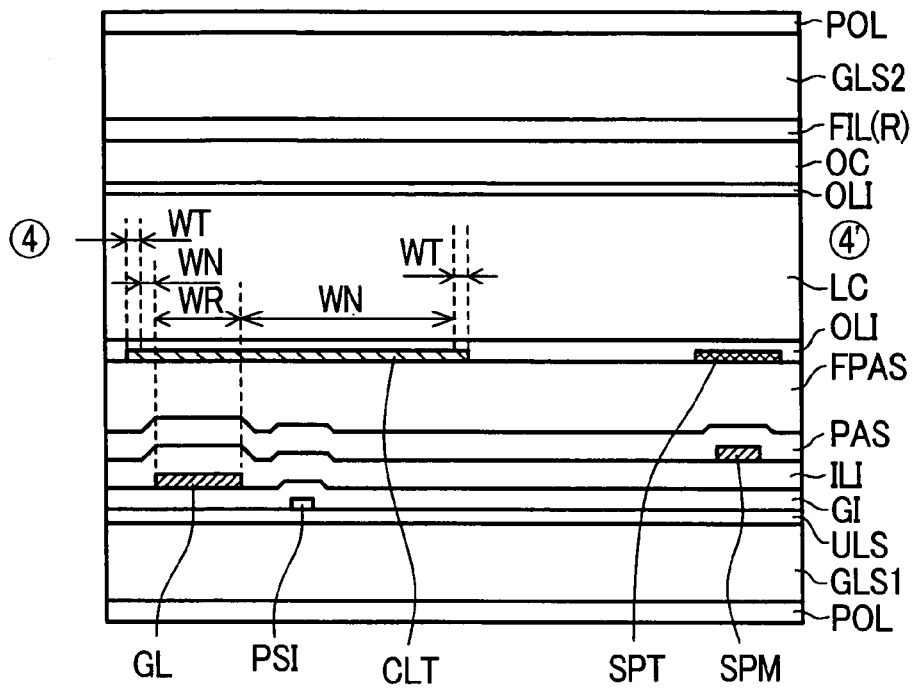
FIG. 4 is a cross-sectional view of an essential part of a pixel taken along a line 4-4' in FIG. 1.

FIG. 1 to FIG. 5 are a plan view and cross-sectional views of a pixel according to a liquid crystal display device of one embodiment of the present invention. FIG. 2, FIG. 3 and FIG. 4 are cross-sectional views taken along cut lines indicated by chain lines as 2-2', 3-3' and 4-4' in FIG. 1 respectively. In these drawings, to facilitate the understanding of the cut portions, numerals are surrounded by circles so as to indicate the cut portions. The drawings show essential parts for explanation purpose and orientation films are omitted from some drawings. Further, the counter-substrate-side constitution is also omitted from some drawings. Hereinafter, these drawings are explained in sequence.

FIG. 1 shows a schematic planar pattern of the pixel. One pixel is configured such that the pixel is surrounded by neighboring gate lines GL and neighboring drain lines DL. The gate line GL also functions as a gate electrode for a TFT formed of a polysilicon PSI and supplies a voltage which turns ON the TFT. The drain line supplies current to the polysilicon PSI. That is, a video voltage (drain voltage) which is applied at the timing that the gate line GL supplies an ON voltage is supplied to the liquid crystal capacitance or the holding capacitance of one pixel and, eventually, the potentials of a metal pixel electrode SPM and a transparent pixel electrode SPT which is connected to the metal pixel electrode SPM assume the video potential.

The flow of the electric current leads to the polysilicon PSI from the drain line DL through a first contact hole CNT1 and the electric current which flows in the polysilicon PSI flows into the metal pixel electrode SPM through a second contact hole CNT2. Further, the electric current reaches a transparent pixel electrode SPT on the insulating film from the metal pixel electrode SPM through a third contact hole CNT3.

In FIG. 1, the drain line DL increases a width thereof locally at a periphery of the contact hole CNT1 which connects the drain line DL and the polysilicon PSI. Due to such a constitution, it is possible to realize the reduction of the connection resistance of the contact hole CNT1 and the stable contact. It is needless to say that the drain line DL can have the uniform width throughout the length provided that the normal contact is ensured.

The common electrode potential of another electrode which constitutes the liquid crystal capacitance or the holding capacitance together with the pixel electrode is applied through a following path. The common potential is, first of all, applied to a lateral common electrode line CLMG which is arranged at the approximately center between the neighboring gate lines GL and a vertical common electrode line CLMD which is arranged at the approximately center between the neighboring drain lines DL. The electricity is supplied to these common electrode lines CLMG, CLMD from a power supply outside a screen. Further, the lateral common electrode line CLMG is made of the same material and is formed by the same steps as the gate lines GL. On the other hand, the lateral common electrode line CLMD is made of the same material and is formed by the same steps as the drain lines DL.

One of the features of this planar structure lies in a point that the lateral common electrode line CLMG and the vertical common electrode line CLMD are connected to each other via a fourth contact hole CNT4. Accordingly, when viewed from the screen region of the liquid crystal display device, there exists a state in which the common electrode lines having low resistance are connected in a mesh pattern so that wiring delay can be made extremely small. These common electrode lines CLMG, CLMD which are made of metal play a role of mainly supplying the potential to the holding capacitance which is defined in an area region where the metal pixel electrode SPM and the lateral common electrode line CLMG are overlapped to each other in plane. The insulating film which forms the holding capacitance is an interlayer insulating film which insulates and separates the gate line GL and the drain line DL. In this manner, by forming the vertical common electrode line CLMD on the same layer as the drain line DL, by forming the lateral common electrode line CLMG on the same layer as the gate line GL, and by connecting both common electrode lines CLMD, CLMG at each pixel, the parasitic capacitance formed between the gate line GL, the drain line DL and the common electrode lines CLMD, CLMG can be reduced and hence, the supply of common electrode potential can be made stable including an advantageous effect brought about by the supply of electricity in a matrix array whereby the display which largely reduces the luminance irregularities and the smear can be realized. Further, with respect to the arrangement of the common electrode lines CLMD, CLMG, since the vertical common electrode line CLMD is arranged in the direction parallel to the drain line DL on the same layer and the lateral common electrode line CLMG is arranged in the direction parallel to the gate line GL on the same layer, the probability of occurrence of short-circuiting between the electrodes on the same layer can be reduced whereby the yield factor can be enhanced. Further, video signals supplied by the drain line include the influence of the gate lines GL due to the capacitive coupling since the drain line DL is arranged in a state that the drain line traverses a large number of gate lines GL. In this embodiment, however, by forming the vertical common electrode line CLMD on the same layer as the drain line DL, the common potential supplied from the vertical direction receives the influence from the gate line GL similar to that of the video signals. As a result, the voltage written in the holding capacitance portion gives rise to a differential voltage between voltages and hence, it is possible to obtain an advantageous effect that the differential voltage works in the direction to cancel the influence of the gate lines GL. Accordingly, the reduction of the display irregularities and the reduction of the smear can be achieved. Further, as can be understood clearly from FIG. 3, a contact hole CNT4 which connects the lateral common electrode line CLMG and the vertical common electrode line CLMD has an upper portion thereof protected by a protective insulating film PAS and hence, the reliability of the connection portion can be enhanced. Further, the leveling is performed using an organic protective film FPAS and hence, the influence to the rubbing can be obviated. Further, by forming the lateral common electrode line CLMG using the gate line layer and by forming the vertical common electrode line CLMD using the drain line layer, it is possible to form the contact hole CNT4 between them using an inorganic insulating film. Accordingly, the size of the contact hole CNT4 can be reduced thus realizing the further enhancement of the numerical aperture.

On the other hand, each pixel region is provided with, besides the common electrode lines CLMG, CLMD which are made of metal electrically connected in a mesh pattern in the above-mentioned manner, the transparent common electrodes CLT which are arranged over the gate lines GL and the drain lines DL above the pixel region by way of an insulating film having the low dielectric constant such that the transparent common electrodes CLT shield these lines GL, DL. Between the neighboring pixels, the transparent common electrodes CLT are formed in a mesh pattern. The transparent common electrodes CLT are bifurcated into the inside of the pixel and play a role of common electrodes which drive the liquid crystal together with the pixel electrode SPT. The transparent common electrodes CLT are not connected to the lateral common electrode line CLMG and the vertical common electrode line CLMD which are made of metal in the inside of the pixel but are connected to them in the peripheral region of the screen. Further, while the lateral transparent common electrode line CLMG and the vertical transparent common electrode line CLMD constitute lines which mainly charge the holding capacitance, the transparent common electrodes CLT play a role of charging the liquid crystal capacitance. In the IPS liquid crystal display device, the liquid crystal capacitance assumes a value which is defined between the transparent common electrodes CLT and the transparent pixel electrode SPT shown in FIG. 1, for example and hence, the value becomes not more than one half compared to the liquid crystal capacitance of the TN type liquid crystal display device which forms the liquid crystal capacitance between electrodes formed over the major regions of surfaces of substrates which face each other. As a result, even when the specification of the wiring resistance of the transparent common electrodes CLT exhibits a relatively high value, it is possible to charge the liquid crystal capacitance. Accordingly, various transparent conductors, that is, ITO (Indium-Tin-Oxide), IZO (Indium-Zinc-Oxide), ITZO (Indium-Tin-Zinc-Oxide), $SnO_2$, $In_2O_3$ and the like can be used. Further, it is possible to obtain the high image quality by suppressing the luminance irregularities and the smear.

The potential of the above-mentioned common electrode and common electrode lines is set to the approximately intermediate potential of the pixel potential which is alternated every frame (explained in detail later in conjunction with FIG. 14). In the liquid crystal display device using the TFTs, it is preferable to set the intermediate potential by taking the fluctuation generated by a jump voltage into consideration. The liquid crystal capacitance and the holding capacitance are formed by the pixel electrode potential and the common electrode potential and, at the same time, the electric field is generated by the potential difference between potentials in the inside of the liquid crystal layer, and images are displayed by the video voltages supplied from the drain line DL and the common voltage. Main transmitting portions are constituted of four opening portions formed along a line 2-2' in FIG. 1.

Hereinafter, the constitutions of respective parts are explained in detail in conjunction with the cross-sectional views. FIG. 2 is a cross-sectional view taken along a line 2-2' in FIG. 1 and shows a portion which traverses one pixel region between the neighboring drain lines DL. A background insulating film ULS which is constituted of a $Si_3N_4$ film having a film thickness of 50 nm and a $SiO_2$ film having a film thickness of 120 nm is formed over an alkalifree TFT glass substrate GLS1 having a strain point of approximately 670 degree centigrade. The background insulating film ULS has a role of preventing the diffusion of impurities such as Na or the like from the TFT glass substrate GLS1. A gate insulating film GI which is formed of $SiO_2$ is formed over the background insulating film ULS.

An interlayer insulating film ILI made of $SiO_2$ is formed such that the film ILI covers all of the above-mentioned parts or members. The drain line DL formed of a three-layered metal film such as Ti/Al/Ti is formed over the interlayer insulating film ILI. The metal pixel electrode SPM which is formed of the same material and by the same steps as the above-mentioned drain lines DL constitutes an electrode which supplies the pixel potential via the second contact hole CNT2 of the TFT in FIG. 1. Further, on the same layer, the vertical common electrode line CLMD which is formed of the same material and by the same steps as the drain lines DL is formed in parallel with the drain lines DL and plays a role to supply the common potential to the holding capacitance.

Onto the drain line DL, a protective insulating film PAS made of $Si_3N_4$ having a film thickness of 200 nm and an organic protective film FPAS containing acrylic resin as a main component and having a film thickness of 2 μm are applied. Over the organic protective film FPAS, first of all, the transparent common electrode line CLT made of indium tin oxide (ITO) and having a width wider than that of the drain line DL is formed. The transparent pixel electrode SPT made of ITO which is formed by the same step and of the same material is also formed over the organic insulating film FPAS.

In the above description, the materials for forming respective lines are not particularly limited.

The main transmitting regions are four regions consisting of (1) a region formed between the transparent common electrode line CLT over the drain line DL and the transparent pixel electrode SPT, (2) a region formed between the above-mentioned transparent pixel electrode SPT and the transparent common electrode line CLT extending upwardly and downwardly from the gate line GL in a plan view shown in FIG. 1 such that the transparent common electrode line CLT covers the vertical common electrode line CLMD, (3) a region formed between the above-mentioned transparent common electrode line CLT and the transparent pixel electrode SPT, and (4) a region arranged between the transparent pixel electrode SPT and the transparent common electrode line CLT arranged over the drain line DL. The above-mentioned transparent pixel electrode SPT and the transparent common electrode line CLT constitute electrodes which drive the liquid crystal.

On the other hand, a substrate which faces the TFT glass substrate GLS1 in an opposed manner and seals liquid crystal LC together with the TFT glass substrate GLS1 is a color filter (CF) substrate GLS2. Color filters (FIL) which are constituted of organic film material dispersing pigments for performing color display at a liquid crystal side thereof are formed over the CF glass substrate GLS2. These color filters FIL express the transmitting lights of blue (B), red (R), green (G) corresponding to colors allocated to respective pixels. For example, the color filter which expresses the transmitting light of red (R) is indicated by FIL (R). On inner sides of these color filters FIL, an overcoat film OC made of organic material is formed. Although the overcoat film OC may be eliminated, the provision of the overcoat film OC is desirable to enhance the flatness. Orientation films OLI are printed on respective surfaces of the CF glass substrate GLS2 and the TFT glass substrate GLS1 which are brought into contact with the liquid crystal LC and a given rubbing is applied to these orientation films OLI so as to control the initial orientation direction of the liquid crystal LC. Further, to respective outer surfaces of the CF glass substrate CLS2 and the TFT glass substrate GLS1, polarizers POL are respectively laminated. These polarizers POL are formed in a so-called crossed Nicols state in which polarization axes cross each other between the glass substrates.

Figure 16:
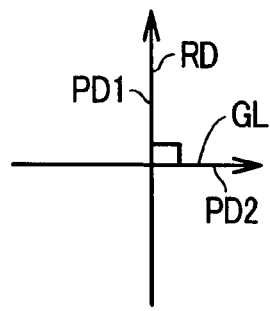
FIG. 16 is a view for explaining the relationship between the polarizer and the initial orientation direction according to one embodiment of the present invention.

The relationship of angle between the rubbing direction and the polarizer is shown in FIG. 16. One polarization axis PD2 is arranged in the same direction as the gate line GL and the other polarization axis PD1 is arranged in the direction perpendicular to the gate line GL. Further, the rubbing directions RD of both upper and lower substrates GLS1, GLS2 are arranged in the direction perpendicular to the gate line GL. Due to such a relationship, an arrangement of normally black mode is obtained. Further, a multi-domain is designed by adopting a bent-shape pixel pattern shown in FIG. 1, it is needless to say that a non-multi-domain is also included in the scope of the present invention. It is necessary to arrange the polarizers in a crossed Nicols state also in such a case.

In the cross section of the CF substrate GLS2, a so-called black matrix BM is not formed. The joining of colors of the color filters FIL is performed over the transparent common electrode line CLT which is arranged to cover the drain lines DL.

One of the features of the cross-sectional structure of this embodiment lies in that with the provision of the transparent pixel electrode SPT and the transparent common electrode CPT over the organic insulating film FPAS, one pixel has at least four divided openings (main transmitting regions) with respect to the liquid crystal LC.

Another feature of the cross-sectional structure of this embodiment lies in that, over the organic protective film FPAS, to apply the liquid crystal display voltage, the metal pixel electrode SPM, the vertical common electrode line CLMD and the drain line DL are arranged below the transparent pixel electrode SPT and the transparent common electrode CLT which are arranged in a spaced-apart manner and have given widths respectively while sandwiching a laminated insulating film formed of the organic insulating film FAPS and the protective film PAS therebetween. The respective widths of the transparent electrodes SPT, CLT are set as follows.

The width of the transparent common electrode line CLT which covers the drain line DL is required to be at least two times larger than the width of the drain line DL. This is because that in the IPS liquid crystal display device, basically, when an electric field other than the electric field generated by the common electrode potential and the pixel potential is applied to the liquid crystal, the smear and the domain occur and hence, a shielding thereof is necessary. On the other hand, the widths of the transparent electrodes SPT, CLT over the metal pixel electrode SPM and the vertical common electrode line CLMD are not limited to the widths of the metal pixel electrode SPM and the vertical common electrode line CLMD since these electrodes SPT, CLT assume the same potential as the potential of the metal pixel electrode SPM and the vertical common electrode line CLMD arranged below the transparent electrodes SPT, CLT. However, in the IPS liquid crystal display device which adopts the positive-type liquid crystal material, the light does not pass over the transparent electrodes. This is because that the lateral electric field is not applied over the electrodes having the large width and hence, the liquid crystal molecules are not rotated. A fringe lateral electric field is applied to a region extending toward the inside of the width from end portions of the transparent electrodes by 1.5 µm and hence, the light passes over this region. Taking the above-mentioned points into consideration, the widths of the metal pixel electrode SPM and the vertical common electrode line CLMD are basically set to values equal to or narrower than the widths of the transparent pixel electrode SPT and the transparent common electrode line CLT arranged over the metal pixel electrode SPM and the vertical common electrode line CLMD. Further, the wiring material of the vertical common electrode line CLMD is equal to the wiring material of the drain line DL and is basically a Ti/Al/Ti line which exhibits the low resistance. The vertical common electrode line CLMD has a feature that even when the width thereof is set to a minimum value which is decided by a process rule, the wiring delay can be made small and hence, there is no possibility that the numerical aperture is reduced. Particularly, in this embodiment, the constitution that the vertical common electrode line CLMD is arranged below the transparent electrode line CLT which is indispensable in the driving of the liquid crystal thus preventing any further reduction of the numerical aperture also constitutes the feature of this embodiment.

FIG. 3 is a cross-sectional view taken along a line 3-3' shown in FIG. 1. This cross-sectional view shows a cross section of the drain line DL—the first contact hole CNT1—the polysilicon layer PSI of the TFT—the second contact hole CNT2—the metal pixel electrode SPM which is arranged over the lateral common electrode line CLMG by way of the interlayer insulating film ILI such that the metal pixel electrode SPM gets over the lateral common electrode line CLMG—the third contact hole CNT3—the fourth contact hole CNT 4 which connects the lateral common electrode line CLMG and the vertical common electrode line CLMD in the plan view shown in FIG. 1. The left side of the cross-sectional view in FIG. 3 shows the cross section of the TFT. The TFT constitutes a so-called MOS TFT having a gate insulating film GI in which the drain line DL and the metal pixel electrode SPM are respectively used as so-called drain electrode and source electrode, and the gate line GL is used as a gate electrode. The p-Si layer is formed over the background insulating film ULS. The drain line DL and the metal pixel electrode SPM are connected to a highly concentrated n-type layer PSI (n$^+$) which is doped with phosphorus of low-temperature polysilicon PSI as impurities through the first contact hole CNT1 and the second contact hole CNT2 formed in the gate insulating film GI and the interlayer insulating film ILI. The highly concentrated n-type layer PSI (n$^+$) is highly conductive and functions as a wiring portion in a pseudo manner. On the other hand, the low-temperature polysilicon PSI below the gate line GL is constituted of a p-type layer PSI(p) doped with boron as impurities and functions as a so-called semiconductor layer. The p-type layer PSI(p) performs a switching operation in which the p-type layer PSI(p) becomes conductive with the gate line GL at an ON potential and becomes non-conductive at an OFF potential. When an ON voltage is applied to the gate line GL, below the gate insulating film GI which is arranged below the gate line GL, a potential formed at an interface of the p-type layer PSI (p) doped with boron as impurities with the gate insulating film GI is inverted so as to form a channel layer and the layer is converted into the n-type so that an ON current flows into the TFT and eventually an electric current flows into the metal pixel electrode SPM whereby the liquid crystal capacitance and the holding capacitance are charged. The holding capacitance Cstg is formed in such a manner that, the lateral common electrode line CLMG is used as one electrode, an interlayer insulating film ILI is used as the insulating film and the metal pixel electrode SPM is used as the other electrode. The holding capacitance Cstg is set to hold the potential during the image display period (holding period) which is determined by the liquid crystal capacitance with respect to a leak current which is increased by a pair of electrons and positive holes generated by irradiation of light by the backlight for display from the TFT glass substrate GLS1 side to the polysilicon PSI of the TFT in FIG. 3. If this value can be set large, it is possible to hold the uniformity over the display screen in an extremely favorable state.

FIG. 4 is a cross-sectional view taken along a line 4-4' in FIG. 1. This cross-sectional view mainly shows the cross-sectional structure ranging from the gate line GL, the low-temperature polysilicon PSI of the TFT and the transparent common electrode line CLT which covers these components to the transmitting region by way of the organic protective film.

The cross-sectional structure shown in FIG. 4 comprises the gate line GL arranged at the left side and the transmitting region arranged at the right side. The gate line GL and the low-temperature polysilicon PSI are covered with the transparent common electrode CLT formed over the protective film PAS and the organic protective film FPAS. This provision is adopted to prevent the occurrence of a phenomenon that with respect to the potential of the gate line GL, the line of electric force of the gate line GL is leaked to the transmitting region sandwiched by the transparent common electrode CLT and the transparent pixel electrode SPT thus inducing an erroneous display operation.

The feature of this structure lies in that the transparent common electrode line CLT which is arranged to cover the above-mentioned gate line GL and low-temperature polysilicon layer PSI exhibits an advantageous effect such as an extremely high quality black matrix BM although the transparent common electrode line CLT is formed of a transparent electrode. As shown in FIG. 2, an electric field E which drives the liquid crystal is a lateral electric field between the transparent common electrode line CLT and the transparent pixel electrode SPT. In the IPS type liquid crystal display device, the liquid crystal molecules LC are rotated by this lateral electric field thus changing the transmissivity with respect to the orthogonal polarizer POL. In the state that there is no electric field or the lateral electric field is small, the polarizer is arranged in a crossed Nicols state and hence, the black display is exhibited. When the electric field is applied, the transmission of the elliptically polarized light is generated and light is transmitted in response to the electric field. Accordingly, in the region where there is no electric field or the electric field is small, even when the transparent common electrode CLT is formed of a transparent electrode made of ITO, the backlight light emitted from the TFT glass substrate GLS1 side is not transmitted and it is possible to obtain the favorable black state even when observed from the CF substrate GLS2 which is an observer side. On the other hand, in the state that the voltage is applied, the lateral electric field components in the fringe state is generated in the region starting from the end portion of the transparent electrode to the inside of the electrode by approximately 1.5 µm (an example of the region when the transparent common electrode line CLT is arranged over the gate line GL being indicated by WT in FIG. 4) and the lateral electric field components contribute to the transmission of the light.

Accordingly, with respect to the image formed of the backlight light from the TFT glass substrate GLS1 side, in the planar structure shown in FIG. 1, the transparent common electrode CLT having the width thereof set to a value which is sufficiently large to cover at least the TFT including the low-temperature polysilicon PSI and the gate line GL, when viewed by human naked eyes, makes a profile of each pixel clear and performs a function similar to the BM to sharpen the image. In FIG. 4, in a WN region over the transparent common electrode CLT, that is, in a region within 1.5 μm from an end portion of the transparent electrode which constitutes a transparent electrode single body, there exist substantially no lateral electric field components and hence, the polarized state of light receives no influence during the transmission of light through the liquid crystal layer whereby the light is shielded by the polarizer POL formed on the CF substrate GLS2. For example, although the low-temperature polysilicon is originally considered to appear in a state that the low-temperature polysilicon PSI is colored in red, the low-temperature polysilicon appears as the black matrix BM in a completely black display state. In a region WR over the gate line GL, the light is completely shielded by the metal and hence, the region WR assumes the black state irrespective of the state of the electric field.

As shown in the cross-sectional view of FIG. 4, in the structure according to this embodiment, a conventional black matrix BM is not formed on the CF substrate GLS2. Accordingly, in the IPS liquid crystal display device which adopts the structure of this embodiment, a step for forming the black matrix BM layer becomes unnecessary so that the manufacturing cost can be reduced. With respect to an external light, the above-mentioned transparent common electrode CLT plays a role of the black matrix BM which exhibits the extremely favorable small reflection. This is an advantageous effect obtained by using the transparent electrode as the light shielding layer. Further, since the light shielding layer is mounted on the substrate which faces the observation-side substrate in an opposed manner, the reflection is further reduced. In the region WN of the transparent common electrode CLT, although the external light is absorbed by the transparent common electrode CLT per se, the protective film PAS, the organic protective film FPAS and the like, since there is no metal layer which exhibits the high reflectivity, the reflection to the observer side is small. On the other hand, the material of the gate line GL is MoW and hence, there exists a slight reflection compared to Al, for example. However, the light passes the protective film PAS and the like formed above the gate line GL twice and receives the effect of the polarizer POL in the crossed Nicols state and hence, the reflection can be suppressed to a small value. In this manner, when the transparent common electrode CLT is used as the black matrix BM, it is possible to form the black matrix BM having an extremely small reflection. Further, since it is unnecessary to form the black matrix BM on the CF substrate GLS2, the tolerance of alignment of the upper and lower substrates is increased thus realizing the enhancement of the productivity. Further, the designing which takes the misalignment into account is no longer necessary and hence, it is possible to use a region which has been conventionally subjected to light shielding extra by the black matrix BM by estimating the tolerance of alignment based on the region which requires light shielding by the black matrix BM whereby the numerical aperture is enhanced. Further, the light shielding region at the end portion of the transparent electrode CLT can make the whole region of the electrode fall in a black display state when the black display is performed, while the light shielding region ranging 1.5 μm from the end of the electrode becomes the transmitting region when the white display is performed. Accordingly, between the black display state in which it is necessary to display image sharply and the white display state in which the bright display is necessary, the light shielding region is kinetically and automatically changed. That is, the light shielding layer made of the transparent electrode functions as a really ideal black matrix BM such that the light shielding region is broadened in the black display and is narrowed in the white display. Accordingly, the enhancement of the clearness of images, the enhancement of contrast and the enhancement of luminance which are considered to conflict each other can be realized at the same time.

Subsequently, the manufacturing steps of the NMOS type TFT shown in FIG. 3 is explained in conjunction with FIG. 5 to FIG. 9 and FIG. 3.

After cleaning the alkalifree TFT glass substrate GLS1 having a thickness of 0.7 mm, a size of 730 mm×920 mm and having a strain point of approximately 670 degree centigrade, the background insulating film ULS is formed by laminating a $Si_3N_4$ film and a $SiO_2$ film over the alkalifree TFT glass substrate GLS1, wherein the $Si_3N_4$ film having a film thickness of 50 nm is formed by a plasma CVD method using a mixed gas of $SiH_4$, $NH_3$ and $N_2$ and, thereafter, the $SiO_2$ film having a film thickness of 120 nm is formed by a plasma CVD method using a mixed gas of tetraethoxysilane and $O_2$. The background insulating film ULS is provided for preventing the diffusion of Na from the TFT glass substrate GLS1 to the polycrystalline silicon film. The formation temperature of both of the $Si_3N_4$ and $SiO_2$ films is 400 degree centigrade. Here, although the polycrystalline silicon is representatively used as the semiconductor layer, the semiconductor layer may be formed of macro-crystalline silicon, continuous grain boundary silicon or amorphous silicon.

Subsequently, an approximately intrinsic hydrated amorphous silicon film having a film thickness of 50 nm is formed by a plasma CVD method using a mixed gas of $SiH_4$ and Ar. The film forming temperature is 400 degree centigrade and the hydrogen quantity immediately after film forming is approximately 5 at %. Subsequently, the substrate is annealed for approximately 30 minutes at a temperature of 450 degree centigrade so as to dissipate hydrogen in the hydrated amorphous silicon film. The hydrogen quantity after annealing is approximately 1 at %.

Subsequently, an excimer laser beam LASER having a wave length of 308 nm is irradiated to the amorphous silicon film at a fluence of 400 $mJ/cm^2$ so as to melt and recrystallize the amorphous silicon film thus obtaining the approximately intrinsic polycrystalline silicon film. Here, the laser beam has a thin elongated line shape of a width of 0.3 mm and a length of 200 mm. The laser beam is irradiated to the substrate by moving the substrate at a pitch of 10 μm in the direction substantially perpendicular to the longitudinal direction of the beam. The irradiation is performed in the nitrogen atmosphere.

Figure 5:
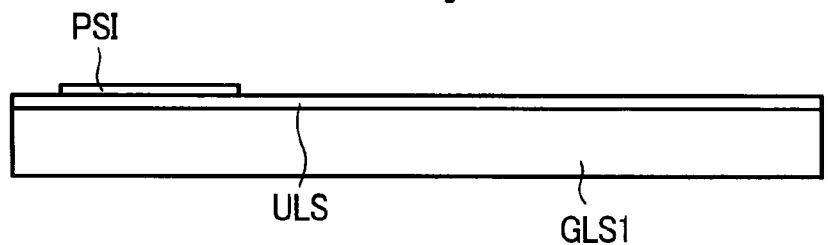
FIG. 5 is a cross-sectional view for explaining a manufacturing method of a TFT substrate of the TFT liquid crystal display device according to one embodiment of the present invention up to the completion of the first photolithography step.

A given resist pattern is formed over the polysilicon film PSI by a usual photolithography method and the polysilicon film PSI is formed into a given shape by a reactive ion etching method using a mixed gas of $CF_4$ and $O_2$ (FIG. 5).

Subsequently, a $SiO_2$ film having a film thickness of 100 nm is formed by a plasma CVD method using a mixed gas of tetraethoxysilane and oxygen thus obtaining the gate insulating film GI. Here, the mixing ratio of tetraethoxysilane and $O_2$ is set to 1:50 and the film forming temperature is set to 400 degree centigrade. Subsequently, B ions are implanted at an acceleration voltage of 33 Kev and a dosed quantity of 1E12 (cm$^{-2}$) by an ion implantation method so as to form the polysilicon film PSI (p) in the channel region of the n-type TFT.

Then, a metal line, that is, a Mo film or a MoW film, for example, having a film thickness of 200 nm is formed by a sputtering method and, thereafter, a given resist pattern is formed over the Mo film by a usual photolithography method. Thereafter, the Mo film is formed into a given shape by a wet etching method using a mixed acid thus obtaining the scanning line GL and the second lateral common electrode line CLMG.

Figure 6:
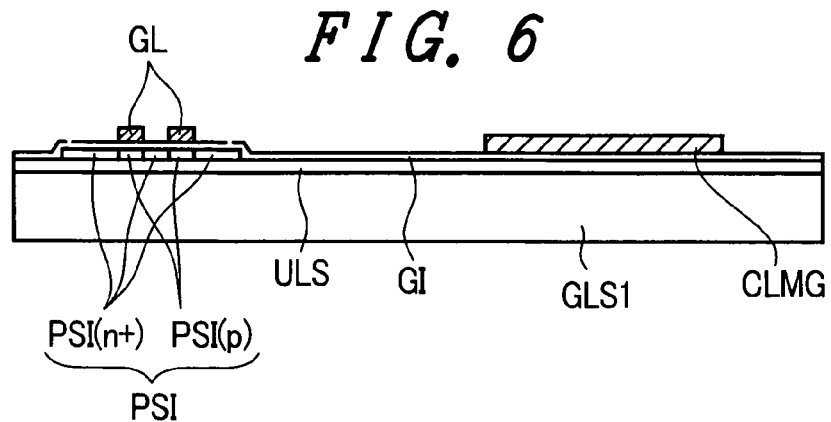
FIG. 6 is a cross-sectional view for explaining the manufacturing method of the TFT substrate of the TFT liquid crystal display device according to one embodiment of the present invention up to the completion of the second photolithography step.

While leaving the resist pattern used for etching as it is, P ions are implanted at an acceleration voltage of 60 Kev and a dosed quantity of 1E15 (cm$^{-2}$) by an ion implantation method so as to form the source and drain regions PSI (n$^{+}$) of the n-type TFT (FIG. 6). Although the n-type TFT in which the source and drains are respectively formed of the (n+)-type low-temperature polysilicon film PSI(n+) and the polysilicon film PSI(p) of p-type channel region is formed in accordance with the above-mentioned steps, it is possible to reduce a leaking current of the TFT by forming an n-type LDD region whose P ion concentration is smaller than that of the (n+)-type region between the p-type region and the (n+)-type region (not shown in the drawing). That is, after removing the resist pattern used for etching, P ions are implanted again at an acceleration voltage of 65 Kev and a dosed quantity of 2E13 (cm$^{-2}$) by an ion implantation method so as to form the LDD region of the n-type TFT. The length of the LDD region is determined based on a side etching quantity at the time of performing the wet etching of Mo. In this embodiment, the length of the LDD region is approximately 0.8 µm. The length can be controlled by changing the over-etching time of Mo.

Subsequently, the implanted impurities are activated by a rapid thermal annealing (RAT) method which irradiates light of an excimer lamp or a metal halide lamp to the substrate. By performing annealing using light which contains a large quantity of ultraviolet rays irradiated from the excimer lamp or the metal halide lamp or the like, it is possible to selectively heat only the polysilicon layer PSI so that any damage which may be caused by heating the glass substrate can be obviated. The activation of the impurities may be performed by the heat treatment at a temperature of approximately 450 degree centigrade provided that shrinkage, bending deformation or the like of substrate is small so that they do not cause any problem (FIG. 6).

Subsequently, a SiO$_2$ film having a film thickness of 500 nm is formed by a plasma CVD method using a mixed gas of tetraethoxysilane and oxygen thus obtaining an interlayer insulating film ILI. Here, a mixing ratio of tetraethoxysilane and oxygen is 1:5 and the film forming temperature is 350 degree centigrade.

Figure 7:
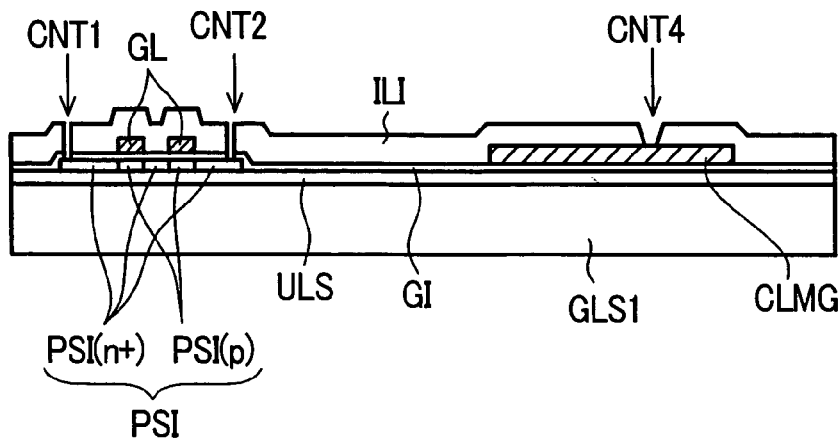
FIG. 7 is a cross-sectional view for explaining the manufacturing method of the TFT substrate of the TFT liquid crystal display device according to one embodiment of the present invention up to the completion of the third photolithography step.

Then, after forming a given resist pattern, by a wet etching method using a mixed acid, the first contact hole CNT1, the second contact hole CNT2 and the fourth contact hole CNT4 shown in a plan view of FIG. 1 are formed in the above-mentioned interlayer insulating film (FIG. 7).

Figure 8:
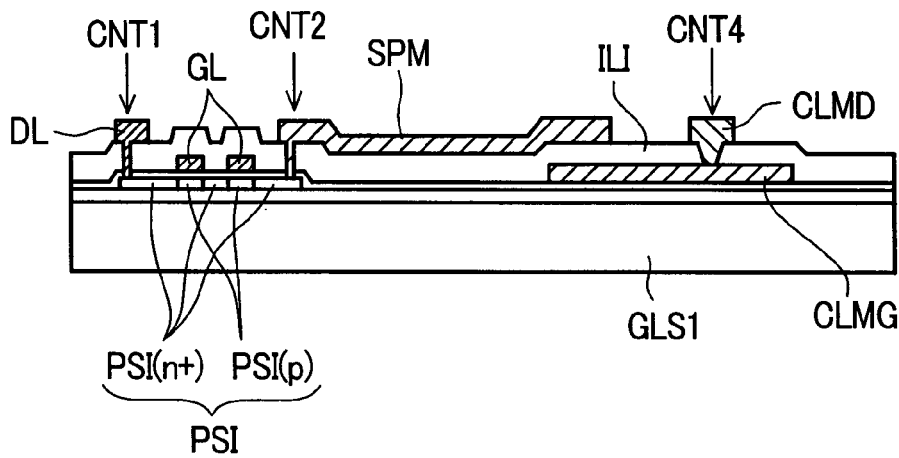
FIG. 8 is a cross-sectional view for explaining the manufacturing method of the TFT substrate of the TFT liquid crystal display device according to one embodiment of the present invention up to the completion of the fourth photolithography step.

Subsequently, by a sputtering method, a Ti film having a film thickness of 50 nm, an Al—Si alloy film having a film thickness of 500 nm and a Ti film having a film thickness of 50 nm are sequentially formed by lamination. Then, a given resist pattern is formed. Thereafter, by a reactive ion etching method using a mixed gas of BCl$_3$ and Cl$_2$, a collective etching is performed thus obtaining the drain line DL, the metal pixel electrode SPM and the vertical common electrode line CLMD (FIG. 8).

Figure 9:
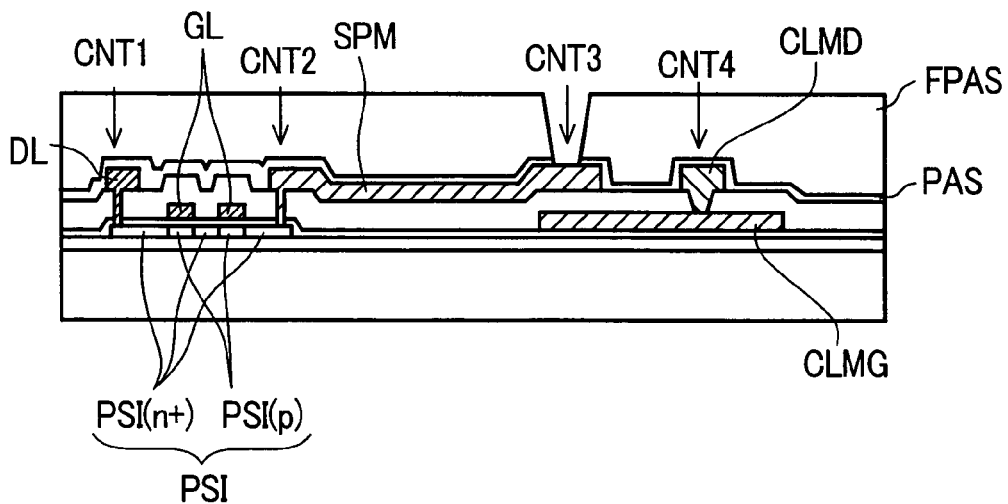
FIG. 9 is a cross-sectional view for explaining the manufacturing method of the TFT substrate of the TFT liquid crystal display device according to one embodiment of the present invention up to the completion of the fifth photolithography step.

The protective film PAS which is a Si$_3$N$_4$ film having a film thickness of 300 nm is formed by a plasma CVD method using a mixed gas of SiH$_4$, NH$_3$ and N$_2$. Further, an acrylic photosensitive resin film having a film thickness of approximately 3.5 µm is applied by a spin coating method and exposure and development are performed using a given mask thus forming through holes in the acrylic resin. Then, the acrylic resin is baked for 20 minutes at a temperature of 230 degree centigrade thus obtaining the leveled organic protective film FPAS having a film thickness of 2.0 µm. Subsequently, using the through hole pattern formed in the organic protective film FPAS as a mask, the Si$_3$N$_4$ film arranged below the organic protective film FPAS is processed by a reactive ion etching method using CF$_4$ thus forming the third contact hole CNT3 in the Si$_3$N$_4$ film (FIG. 9).

By processing the insulating film which constitutes the layer below the organic protective film FPAS using the organic protective film FPAS as a mask, films in two layers can be patterned in one photolithography step so that the entire steps can be simplified.

Finally, the transparent conductive film such as an ITO film having a film thickness of 70 nm is formed by a sputtering method. Then, by a wet etching using a mixed acid, the transparent conductive film is processed in a given shape thus forming the transparent common electrode line CLT and the transparent pixel electrode SPT whereby the active matrix substrate is completed (FIG. 3). As described above, the polycrystalline silicon TFT is formed by performing the photolithography steps 6 times or more.

Figure 10:
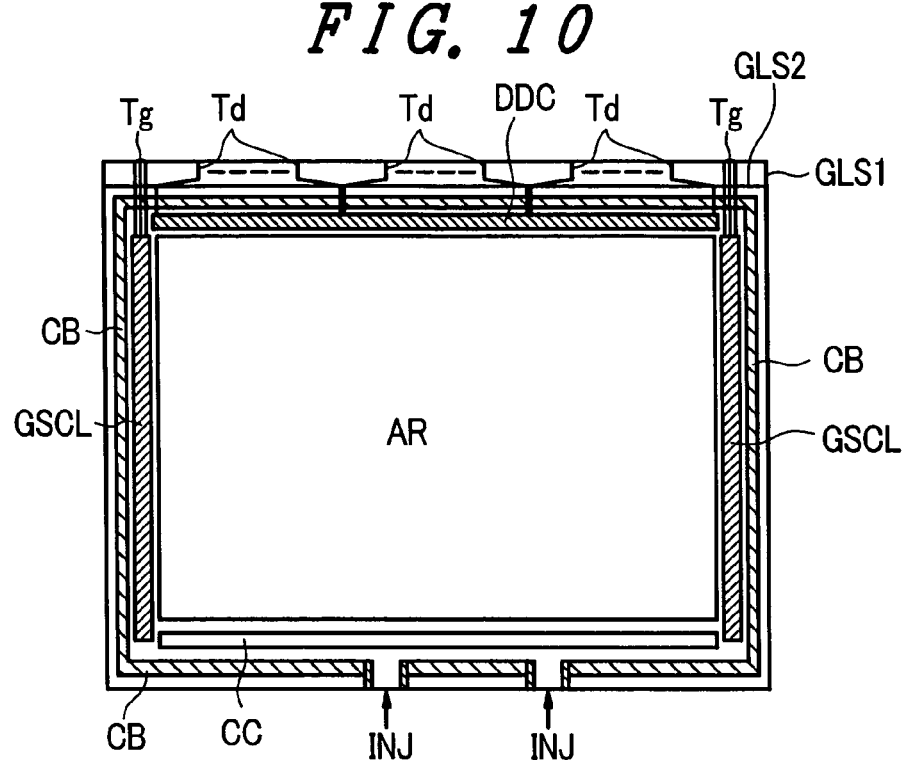
FIG. 10 is an overall plan view of a LCD cell.

Subsequently, the planar structure of the overall appearance of the liquid crystal panel is explained. FIG. 10 is a plan view of an essential part around a matrix (AR) of a display panel including upper and lower glass substrates GLS1, GLS2. In manufacturing the panel, when the panel is of a small size, for enhancing the throughput, a plurality of devices are simultaneously processed on a sheet of glass substrate and, thereafter, the glass substrate is divided. On the other hand, when the panel is of a large size, for enabling the common use of a manufacturing installation, a glass substrate which is standardized for any types of panels is processed and is reduced into a size which matches each type of panel and the glass substrate is cut after making the glass substrate pass through a series of steps.

FIG. 10 shows the latter case and shows a state in which the upper and lower substrates GLS1, GLS2 are already cut. In both cases, in a completed state, the size of the upper substrate GLS2 is made smaller toward the inside than the lower side substrate GLS1 such that a portion (upper side in the drawing) where groups of external connection terminals Tg, Td are present is exposed. With respect to the groups of terminals Tg, Td, the group of terminals Tg are the connection terminals for power supply and timing data which are supplied to a scanning circuit GSCL of the low-temperature polysilicon TFT which are arranged at left and right sides of the display region AR on the TFT glass substrate GLS1. The group of terminals Td are connection terminals for supplying video data or power source data to a video signal circuit DDC of the low-temperature polysilicon TFT formed on the TFT glass substrate GLS1 and over an upper portion of the display region AR. These groups of terminals are named by arranging a plurality of lead line portions per tape carrier package TCP (FIG. 11) on which an integrated circuit chips CHI are mounted. The lead lines extending from matrix portions of respective groups to external connection terminal portions through the video signal circuit DDC are inclined as these lead lines approach both ends. Such an arrangement is provided for matching the arrangement pitch of the package TCP and the connection terminal pitch at respective packages TCP with the arrangement pitch of the video signal terminals Td of the display panel.

A seal pattern SL for sealing the liquid crystal LC is formed between the transparent glass substrates GLS1, GLS2 along peripheries of these substrates GLS1, GLS2 except for a liquid crystal filling port INJ. The sealing material is, for example, made of epoxy resin.

The orientation films ORI whose cross-sectional structure is shown in FIG. 2 are formed in the inside of the seal pattern SL. The liquid crystal LC is sealed in a region defined by the lower orientation film ORI and the upper orientation film ORI which set the direction of liquid crystal molecules and the seal pattern SL.

The liquid crystal display device is assembled such that various types of layers are laminated at the lower transparent TFT glass substrate GLSI side and the upper transparent CF glass substrate GLS2 side separately, the seal pattern SL is formed at the substrate GLS2 side, the lower transparent glass substrate SUB1 and the upper transparent glass substrate GLS2 are superposed each other, the liquid crystal LC is filled through the liquid crystal filling port INJ formed in the sealing material SL, the liquid crystal filling port INJ is plugged by epoxy resin or the like, and the upper and lower substrates GLS1, GLS2 are cut.

Figure 11:
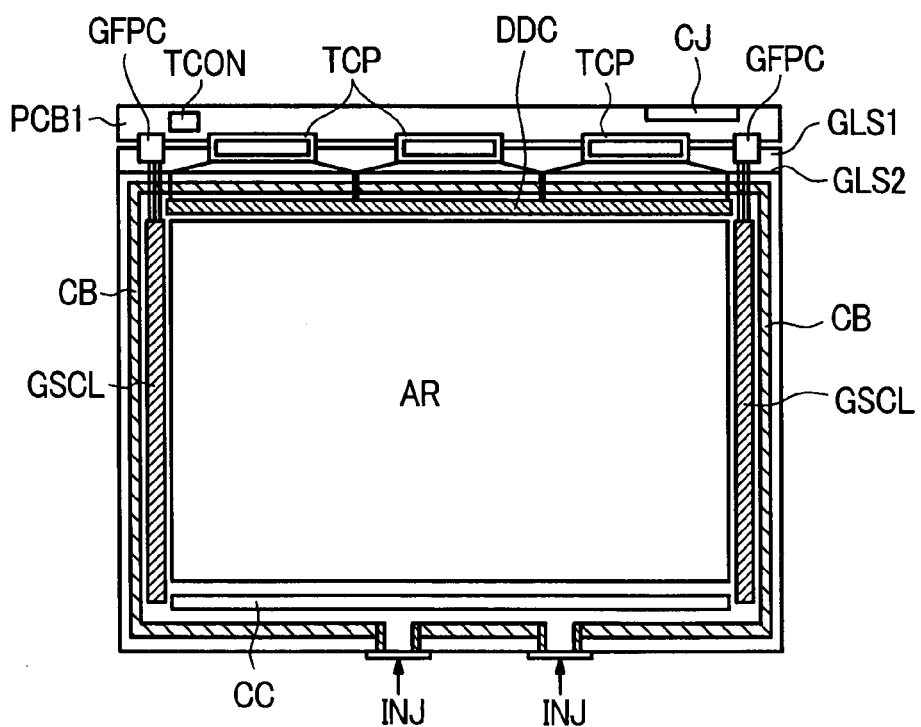
FIG. 11 is an overall plan view showing a state in which a PCB board and a TAB are connected to the LCD cell.

FIG. 11 is a plan view showing a state in which the tape carrier packages TCP which mount the video signal driving ICs on the display panel shown in FIG. 10 and the signal circuit DDC which is formed over the TFT substrate GLS1 using the low-temperature polysilicon TFT are connected to each other and a state in which the scanning circuit GSCL which is formed over the TFT substrate GLS1 using the low-temperature polysilicon TFT and the outside are connected to each other.

TCP indicates the tape carrier package on which driving IC chips are mounted by a tape automated bonding method (TAB) and PCB1 indicates a driving circuit board on which the above-mentioned TCP, a TCON constituting a control IC, a power supply amplifier, resisters, capacitors and the like are mounted. CJ indicates a connector connection portion for introducing signals and power supply from a personal computer or the like.

Figure 12:
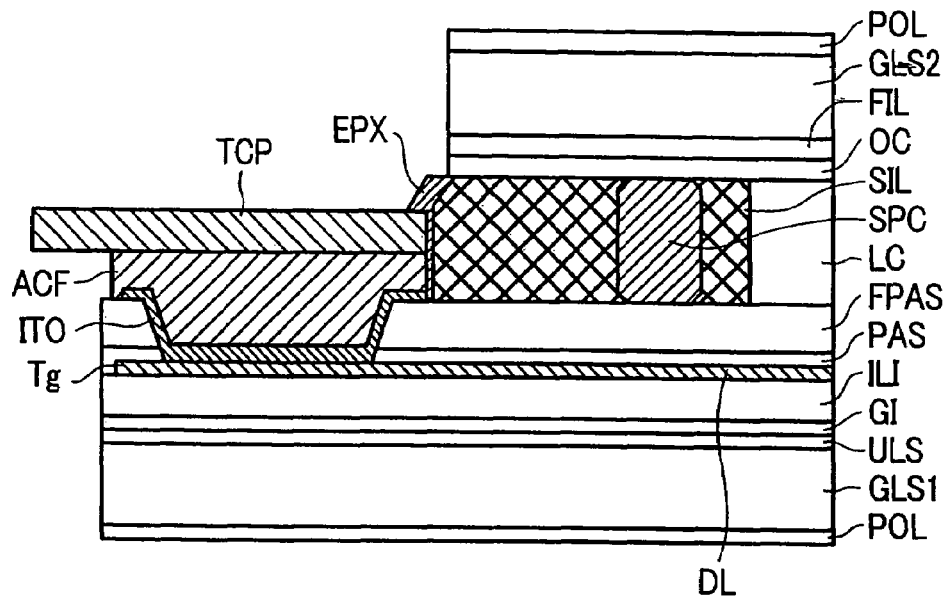
FIG. 12 is a cross-sectional view of the TAB of the LCD cell and a neighborhood of a drain-side pull-out terminal portion.

FIG. 12 is a cross-sectional view of an essential part showing a state in which the tape carrier package TCP is connected to the signal circuit terminal Td of the liquid crystal display panel. The tape carrier package TCP is connected to the liquid crystal display panel through an anisotropic conductive film ACF. The tape carrier package TCP has an output terminal thereof electrically connected to the connection terminal Td at the panel side. The tape carrier package TCP is formed so as to cover an opening portion formed in the protective film PAS and the organic protective film FPAS of the TFT and is connected to the transparent electrode ITO which is formed in the same manner as the transparent common electrode line CLT. The gap defined between the upper and lower glass substrates GLS1, GLS2 outside the seal pattern SL is protected by epoxy resin EPX or the like after cleaning. Silicone resin is further filled between the tape carrier package TCP and the upper CF substrate GLS2 so as to ensure the multiple protection (not shown in the drawing). Further, the gap defined for filling the liquid crystal LC between the upper and lower glass substrates GLS2, GLS1 has a height thereof determined by support columns SPC formed of an organic film or fibers.

Figure 13:
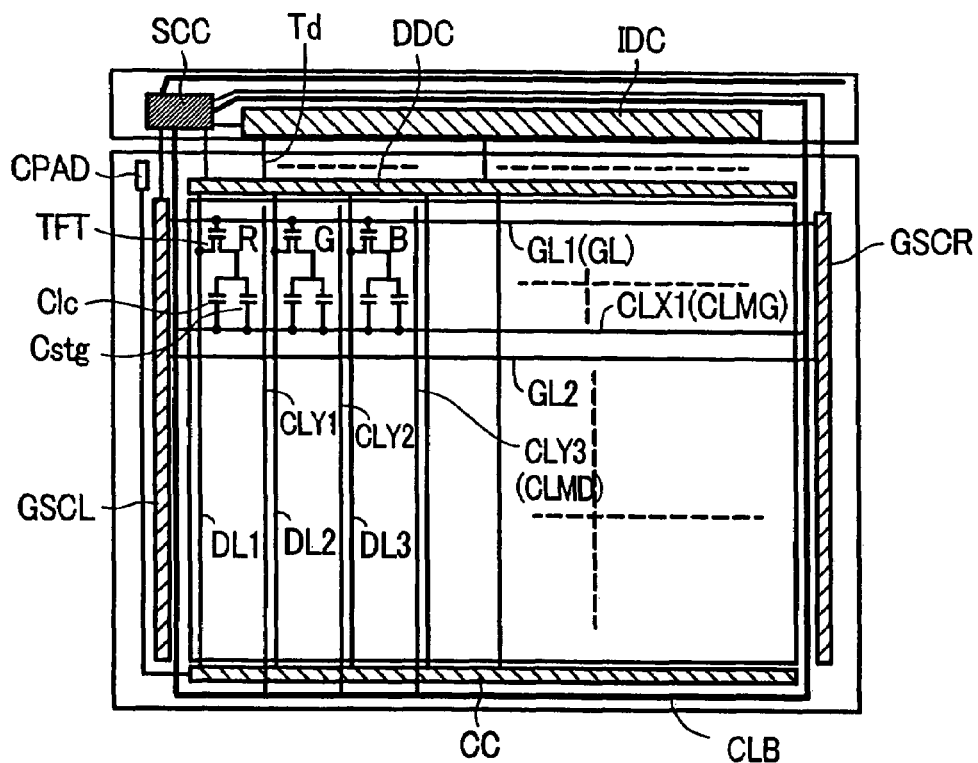
FIG. 13 is a plan view expressing a schematic equivalent circuit of the TFT liquid crystal display device according to one embodiment of the present invention.

A wiring chart between an equivalent circuit of a display matrix portion and a peripheral circuit around the equivalent circuit is shown in FIG. 13. In the drawing, DL indicates drain lines, wherein numerals in the symbols DL1, DL2 and DL3 indicate the order of the arrangement of the drain lines (video signal lines) within the screen from the left side of the screen. Suffixes R, G and B are respectively added corresponding to red, green and blue pixels. GL indicates gate lines, wherein numerals in the symbols GL1, GL2 indicate the order of the arrangement of the gate lines within the screen from the upper side of the screen. Suffixes 1, 2 are added in accordance with the order of scanning timing. CLX indicates lateral common electrode lines CLMG, wherein numerals in the symbols CLX1, CLX2 indicate the order of arrangement of the lateral common electrode lines CLX within the screen from the upper side of the screen. On the other hand, CLY indicates vertical common electrode lines CLMD and numerals in the symbols CLY1, CLY2 indicate the order of arrangement of the vertical common electrode lines CLY within the screen from the left side of the screen.

The gate lines GL (suffixes being omitted) are connected to the scanning circuit GSCL on the glass substrate and electricity and timing signals are supplied to the scanning circuit from a power supply and a timing circuit SCC which are formed over a printed circuit board PCB arranged outside the glass substrate. In the above-mentioned constitution, to the scanning circuit formed over the glass substrate which is constituted of the low-temperature polysilicon TFT, electricity is supplied from both left and right sides with respect to one gate line (scanning line) to enhance the redundancy. However, electricity may be supplied to the scanning circuit from one side corresponding to the size of the screen or the like.

On the other hand, the supply of electricity is performed from the signal circuit DDC which is formed over the glass substrate and constituted of the low-temperature polysilicon TFT. The signal circuit DDC has a function of distributing the video data from the circuit constituted of the video signal circuit IC on the glass substrate in response to color data of R, G, B. Accordingly, the number of connection terminals from the signal circuit on the glass substrate is one third of the number of the drain lines within the screen.

Further, in this embodiment, the common electrode lines are constituted of the lateral transparent common electrode lines CLX (CLMG), the vertical common electrode lines CLY (CLMD) and the transparent common electrodes CLT. As shown in FIG. 1, the lateral common electrode lines CLX and the vertical common electrode lines CLY are connected within the pixel and form the metal wiring in a matrix array. The lateral common electrode lines CLX are pulled out to the left and right sides of the screen and are collectively connected to a common electrode bus line CLB having low impedance and, thereafter, are connected to the power supply and the timing circuit SCC. The vertical common electrode lines CLY are pulled out to the bottom side of the screen and are collectively connected to a common electrode bus line CLB having low impedance and, thereafter, are connected to the power supply and the timing circuit SCC in the same manner. As shown in FIG. 1, the transparent electrode lines CLT are not connected with the lateral common electrode line CLX and the vertical common electrode line CLY within the screen. However, on the periphery of the screen, the transparent electrode lines CLT are connected with the lateral common electrode line CLX in the left and right direction and are connected with the vertical common electrode line CLY on the bottom portion and, thereafter, are connected to the common electrode bus lines CLB and are connected to the external power supply and the timing circuit SCC. Although not shown in FIG. 13, the common electrode lines are arranged in a matrix array. The common electrode lines give the common potential to the pixels in the screen.

The low-temperature polysilicon TFT within the screen is an n-type TFT. The display is performed by applying a gate voltage to the gate lines GL and by supplying a drain voltage (data) which is supplied to the drain lines DL at the timing of supplying the gate voltage to the gate lines GL to the liquid crystal capacitance Clc between the drain line DL and the common electrode lines CLT. To enhance the ability to maintain the potential of the liquid crystal capacitance Clc during the display period, the holding capacitance Cstg is formed between the lateral common electrode line CLMG and the metal pixel electrode SPM as shown in FIG. 3. CC indicates an inspection circuit formed of a low-temperature polysilicon TFT which inspects the disconnection of the drain lines DL. CPAD indicates an inspection terminal.

Figure 14:
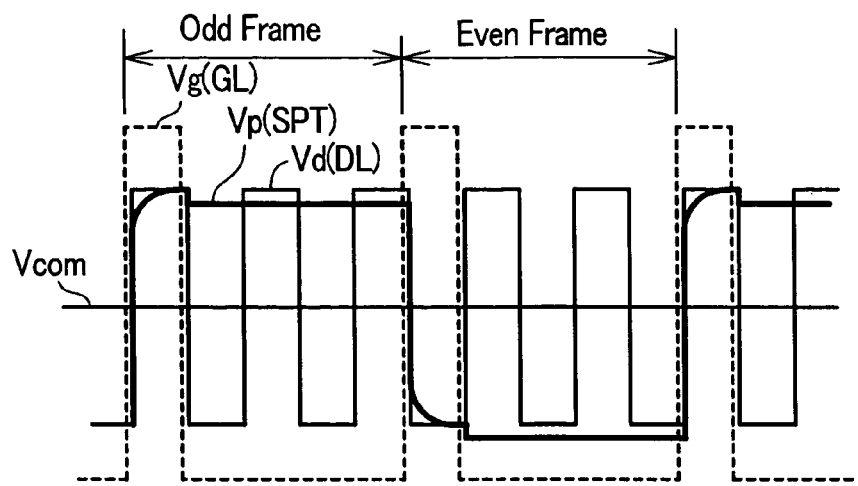
FIG. 14 is a timing chart expressing driving waveforms of the pixel of the TFT liquid crystal display device according to one embodiment of the present invention.

FIG. 14 shows driving waveforms of the liquid crystal display device of the present invention. FIG. 14 shows an example when the common electrode voltage Vcom is a direct current voltage. The gate voltage Vg sequentially scans every gate line. When a voltage obtained by adding a threshold voltage of the low-temperature polysilicon TFT of the pixel is applied to the drain potential Vd, the pixel TFT assumes an ON state and the gate voltage Vg is charged into the liquid crystal capacitance Clc shown in FIG. 13. The above-mentioned common electrode voltage Vcom, the gate voltage Vg, and the drain voltage Vd are respectively applied to the lateral common electrode lines CLX, the vertical common electrode lines CLY shown in FIG. 13 and the transparent common electrode line CLT, the gate lines GL and the drain lines DL shown in FIG. 1. In this embodiment, the drain voltage Vd indicates a voltage which is used when a white display is performed at a liquid crystal display in a normal black mode, for example, wherein the gate line is selected every one line and the polarity is inverted to the plus side or the minus side with respect to the common electrode voltage Vcom every line. Although the pixel potential Vp is charged into the liquid crystal capacitance Clc through the TFT, the pixel potential Vp is inverted with respect to the common electrode potential Vcom at odd or even frames. With respect to the gate line GL of the TFT at a specific address, when the gate line GL is selected and the gate voltage Vg becomes larger than the drain voltage Vd, the potential corresponding to the images is charged into the liquid crystal capacitance Clc. However, as mentioned above, in the subsequent frame, the potential of liquid crystal capacitance Clc must be held until the drain voltage Vd inverted with respect to the common electrode potential Vcom is applied. This holding rate is lowered when an OFF (leak) current of the TFT is increased. To prevent the lowering of the holding rate, it is necessary to set the holding capacitance Cstg of the equivalent circuit shown in FIG. 13 to a large value. Assuming that the holding capacitance Cstg is set to a large value, when the parasitic capacitance of the common electrode lines is large, the wiring delay is increased and the luminance irregularities, the smear, the image retention or flickers are generated. Further, it is impossible to maintain the uniformity of display on the screen. However, as shown in the plan view of FIG. 1 and the cross-sectional view of FIG. 3, in this embodiment, the lateral common electrode lines CLMG and the vertical common electrode lines CLMD which are made of metal material are connected in the screen in a matrix array thus reducing the resistance. On the other hand, the transparent common electrodes CLT are connected between the pixels over the organic insulating film within the screen, while the transparent common electrodes CLT and the metal common electrode lines CLMG, CLMD are not directly connected to each other within the screen. However, the transparent common electrodes CLT are served for merely charging the liquid crystal capacitance and hence, the material having a relatively high resistance can be used as the material of the transparent common electrodes CLT as mentioned previously. Further, outside the screen, the transparent common electrodes CLT are connected to the common electrode bus line CLB having low impedance shown in FIG. 13 so that the resistance is further reduced. Due to such advantageous effects, according to this embodiment, even when the holding capacitance Cstg is increased, it is possible to enhance the uniformity of image quality of the screen.

Figure 15:
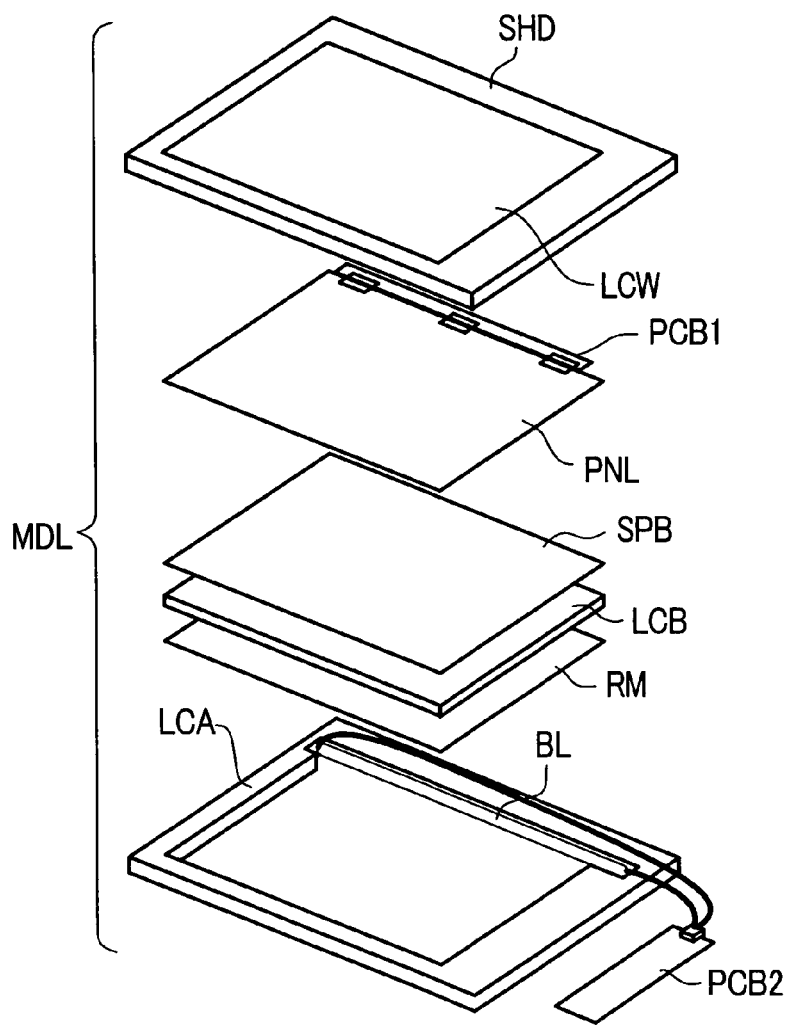
FIG. 15 is an explanatory view showing one example of the module constitution of the present invention.

FIG. 15 is an exploded perspective view showing respective constitutional parts of a liquid crystal display module MDL. SHD indicates a frame-like shield case (metal frame) made of a metal plate, LCW indicates a display window of the shield case SHD, PNL indicates a liquid crystal display panel, SPB indicates a light diffusion plate, LCB indicates a light guide body, RM indicates a reflection plate, BL indicates a backlight fluorescent tube and LCA indicates a backlight case. The module MDL is assembled by laminating respective members in accordance with the vertical arrangement relationship shown in the drawing.

The module MDL has the whole structure thereof fixed by pawls and hooks mounted on the shield case SHD. The backlight case LCA is configured such that a backlight fluorescent lamp BL, the light diffusion plate SPB, the light guide body LCB and the reflection plate RM can be accommodated therein. Light emitted from the backlight fluorescent tube BL which is arranged along a side surface of the light guide body LCB is formed into a uniform backlight on a display screen through the light guide body LCB, the reflection plate RM and the light diffusion plate SPB and the backlight is irradiated to the liquid crystal display panel PNL side. The backlight fluorescent tube BL is connected to an inverter printed circuit board PCB2 which constitutes a power supply of the backlight fluorescent tube BL.

Embodiment 2

Figure 17:
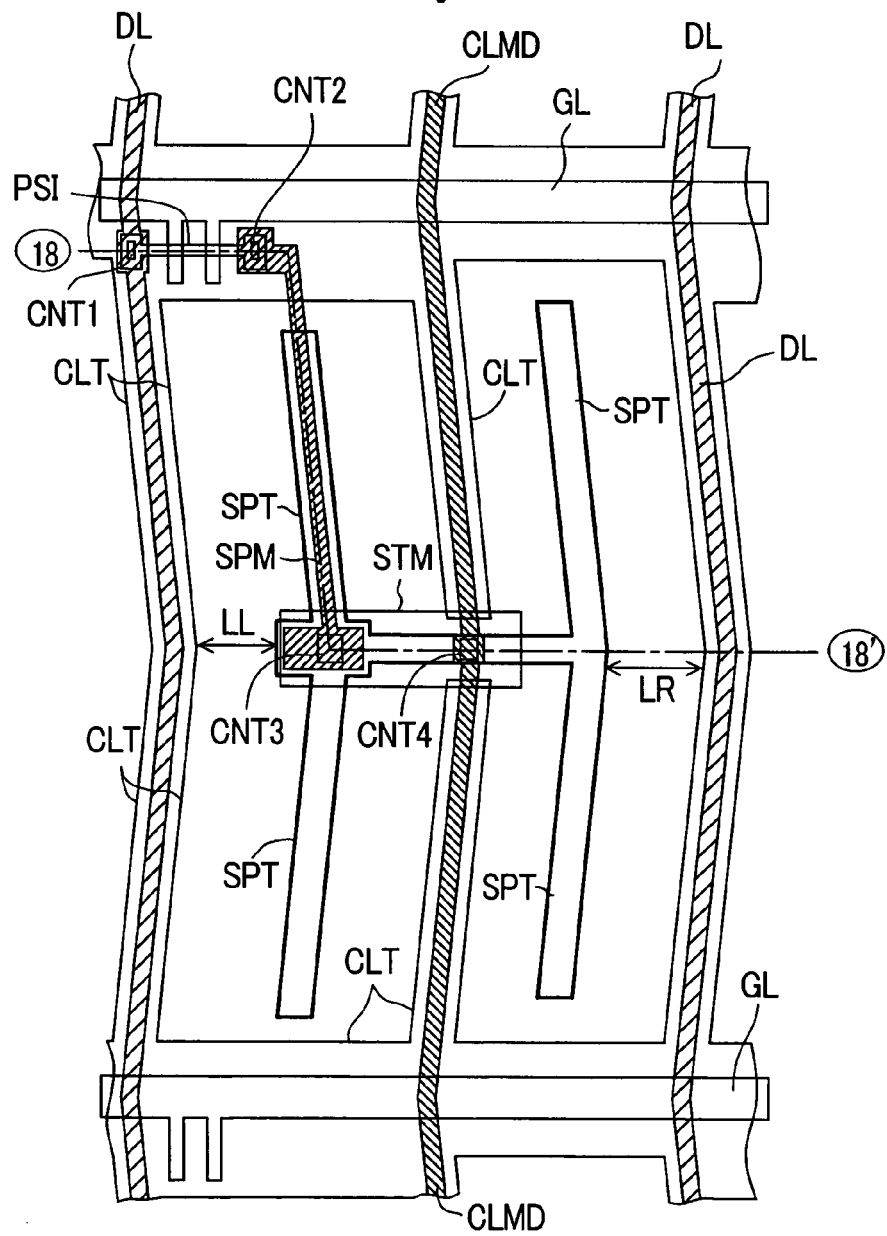
FIG. 17 is a plan view of a pixel of a TFT liquid crystal display device according to another embodiment of the present invention.
Figure 18:
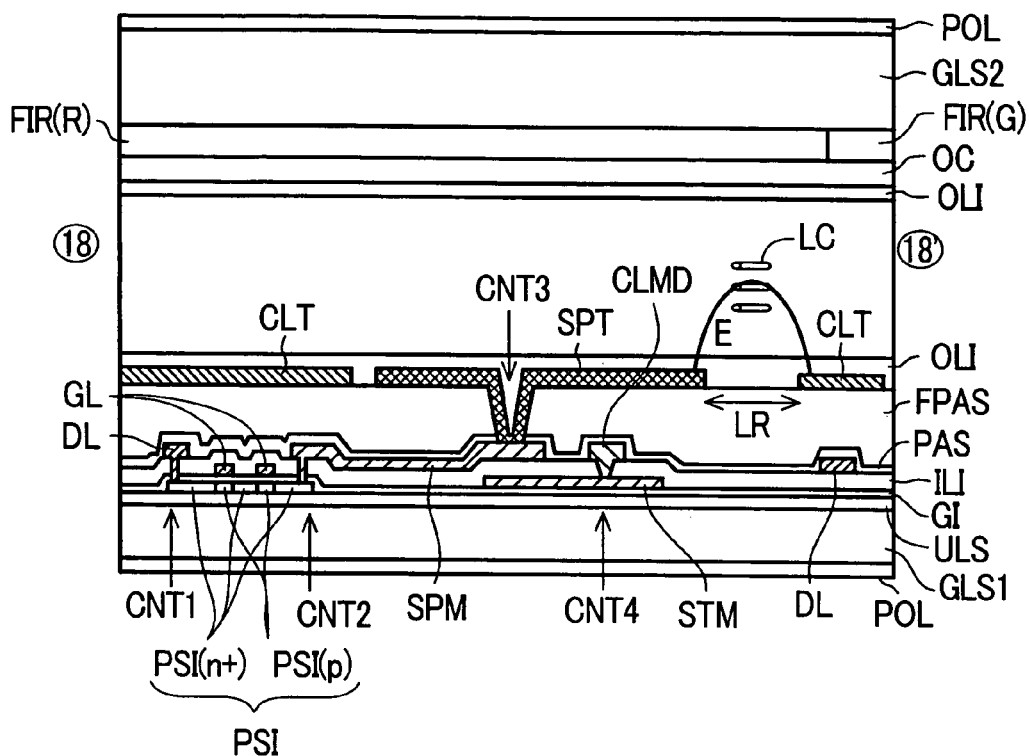
FIG. 18 is a cross-sectional view of an essential part taken along a line 18-18' in FIG. 17.

FIG. 17 is a plan view showing the pixel of the second embodiment of the present invention and FIG. 18 is a cross-sectional view taken along a cut line indicated by chain lines as 18-18' in FIG. 17. In the drawing, to facilitate the understanding of the cut portions, numerals are surrounded by circles so as to indicate the cut portion.

FIG. 17 shows an IPS mode pixel pattern which has 4 main transmitting portions in the direction which traverses the drain lines DL in the same manner as the embodiment 1. Although the constitution of this embodiment is similar to the constitution of the embodiment 1, the important feature of this embodiment lies in that as the common electrode line which is made of metal, only the vertical common electrode lines CLMD are arranged. That is, the lateral common electrode lines CLDM which are arranged in the constitution shown in FIG. 1 are eliminated. That is, this embodiment adopts the new constitution for forming the holding capacitance. Further, due to such a constitution, the numerical aperture can be further enhanced compared to the numerical aperture of the constitution according to the embodiment 1.

The holding capacitance Cstg is formed in the following manner. First of all, the holding capacitance electrode STM which is formed by the same step and formed of the same material as the gate line GL is processed in an island shape. The holding capacitance electrode STM is connected to a vertical common electrode line CLMD via a fourth contact hole CNT4. On the other hand, a metal pixel electrode SPM which extends from a second contact hole CNT of a TFT formed of low-temperature polysilicon PSI extends over the holding capacitance electrode STM. The holding capacitance is formed of overlapped area portions of the metal pixel electrode SPM and the holding capacitance electrode STM which overlap each other by sandwiching an interlayer insulating film therebetween. The transparent pixel electrode SPT is connected to the metal pixel electrode SPM via a third contact hole CNT3 and hence, a pixel potential is supplied to the liquid crystal. On the other hand, although a transparent common electrode line CLT is not connected to the vertical common electrode line CLMD within the screen, the transparent common electrode lines CLT are connected to them outside the pixel region so as to supply the common potential to the liquid crystal.

Due to such a constitution, following two new advantageous effects can be obtained. The first advantageous effect is that among four transmitting regions in a plan view of the pixel shown in FIG. 17, a new opening portion which is defined by the transparent electrode line CLT which covers the drain line DL and the transparent pixel electrode SPT at the inner side within the pixel is formed by eliminating the lateral common electrode line shown in FIG. 1 of the embodiment 1 (region defined by lines LL, LR shown in FIG. 17). Due to such a constitution, it is possible to provide the bright IPS type liquid crystal display device. The second advantageous effect is that the parasitic capacitance of the drain line DL can be reduced by eliminating the lateral common electrode line CLMG which crosses the drain line DL. Accordingly, the number of division of a circuit incorporated in the drain division circuit DDC shown in FIG. 13 can be increased and hence, the number of components constituted of the TCPs shown in FIG. 11 can be reduced whereby the manufacturing cost can be reduced.

FIG. 18 is a cross-sectional view taken along a cut line 18-18' in FIG. 17. The drain voltage which constitutes the video signal is transmitted to the low-temperature polysilicon PSI from the drain line DL via the first contact hole CNT1. When the ON voltage is applied to the gate line GL, the MOS type TFT is operated and the video voltage is transmitted to the metal pixel electrode SPM which is connected to low-temperature polysilicon PSI via the second contact hole CNT2. Finally, the video voltage is transmitted to the transparent pixel electrode SPT which is connected to the metal pixel electrode SPM via the third contact hole CNT3 and forms the pixel potential which constitutes one of the liquid crystal capacitances. The common voltage which constitutes another potential for driving the liquid crystal is applied to the transparent common electrode line CLT. A new opening portion indicated by LR in FIG. 17 constitutes a new transmitting region which is formed by the lateral electric field applied to the transparent pixel electrode SPT and the transparent common electrode line CLT so that it is possible to provide the bright liquid crystal display device.

Further, as can be understood from the drawing, the black matrix BM is not formed on the CF substrate GLS2 and the TFT formed of the low-temperature polysilicon PSI and the gate line GL are covered with the transparent common electrode line CLT which is arranged over the organic protective film FPAS. Although the transparent common electrode line CLT is a transparent electrode, the transparent common electrode line CLT forms the region to which the lateral electric field is not applied thus playing a role of the favorable black matrix BM.

Further, since the lateral common electrode line CLMG is selected as the common electrode line to be eliminated in this embodiment, it is possible to maintain the advantageous effect which is explained in conjunction with the embodiment 1, that is, the advantageous effect that the vertical common electrode line CLMD is formed on the same layer as the drain line DL and traverses the gate lines GL and hence, the gate potential with respect to the holding capacitance can be cancelled.

Embodiment 3

Figure 20:
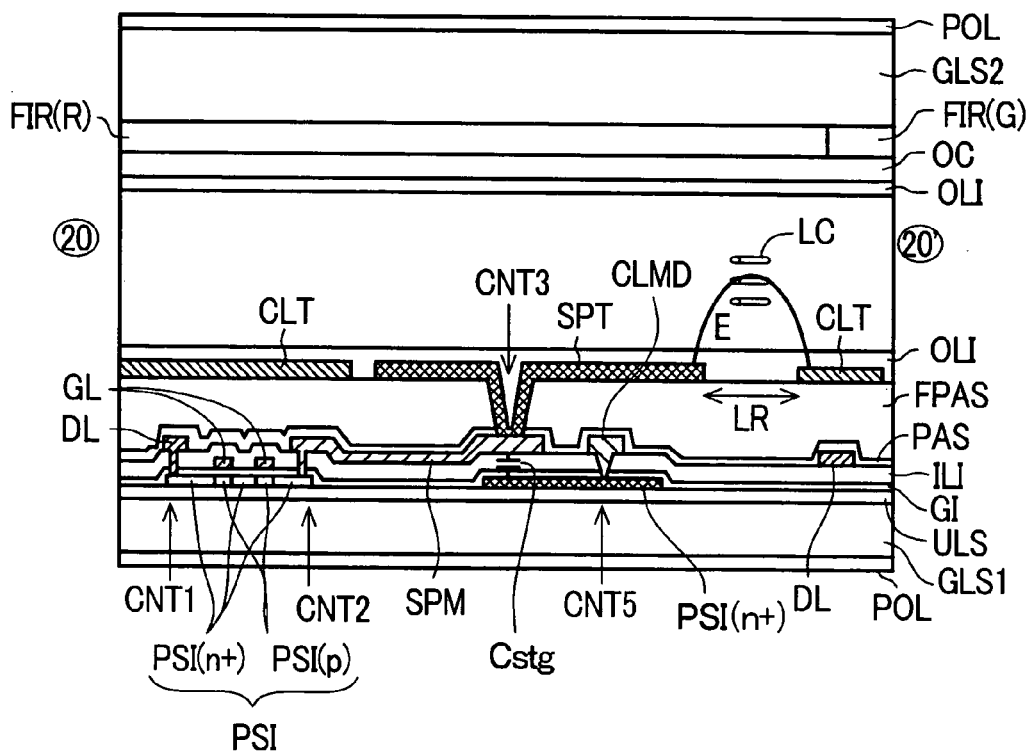
FIG. 20 is a cross-sectional view of an essential part taken along a line 20-20' in FIG. 19.
Figure 19:
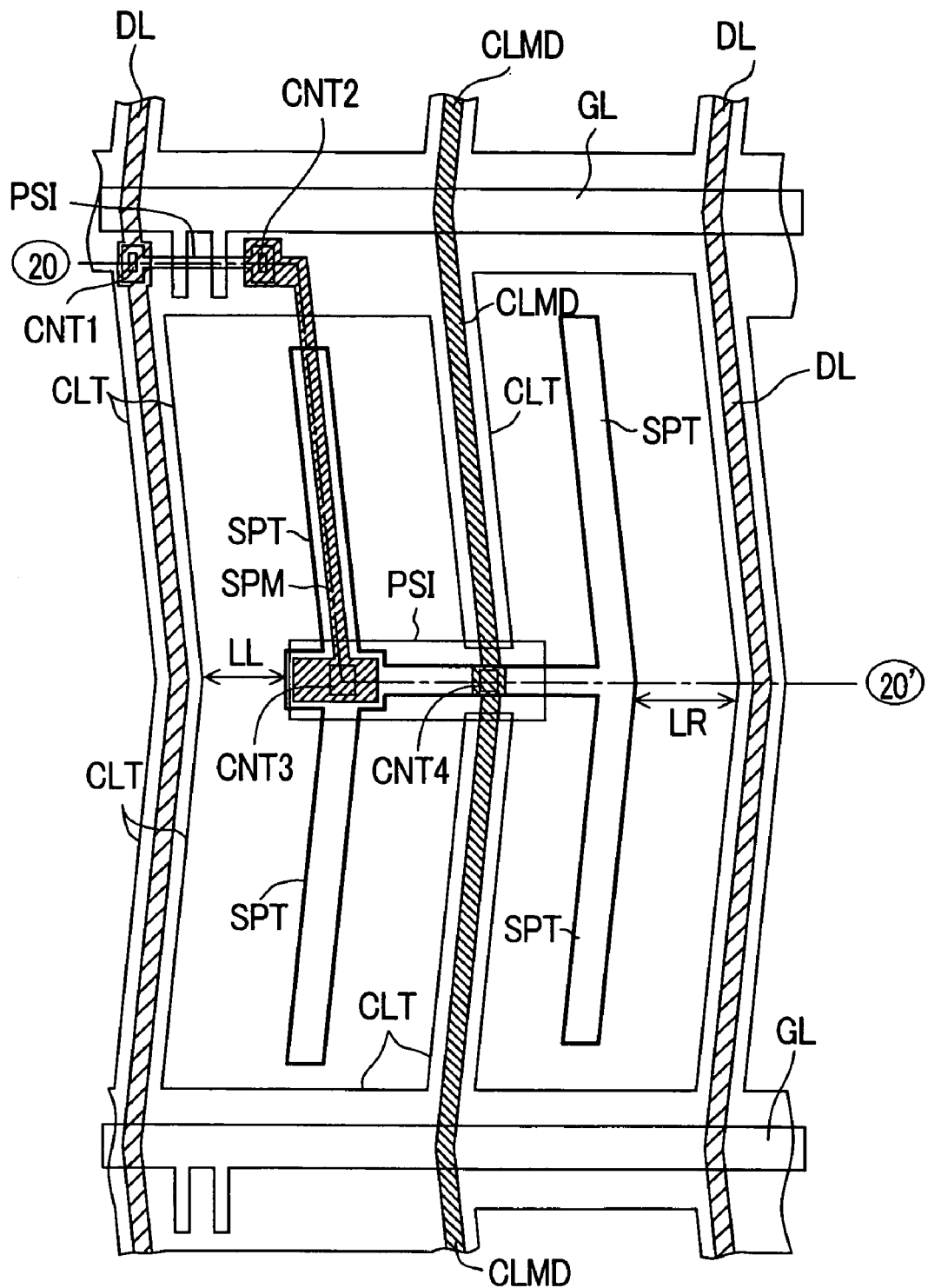
FIG. 19 is a plan view of a pixel of a TFT liquid crystal display device according to another embodiment of the present invention.

FIG. 19 is a plan view showing the pixel of the third embodiment of the present invention and FIG. 20 is a cross-sectional view taken along a cut line indicated by chain lines as 20-20' in FIG. 19. In the drawing, to facilitate the understanding of the cut portions in the drawing, numerals are surrounded by circles so as to indicate the cut portion.

FIG. 19 shows an IPS mode pixel pattern which has 4 main transmitting portions in the direction which traverses the drain lines DL in the same manner as the embodiment 2. Although the constitution of this embodiment is similar to the constitution of the embodiment 2, the important feature of this embodiment lies in that a lower electrode of the holding capacitance Cstg is constituted of a polysilicon PSI and the polysilicon PSI is connected to a vertical common electrode line CLMD by way of a fifth contact hole CNT5. Due to such a constitution, a short-circuiting defect ratio on an insulating film which constitutes the holding capacitance Cstg is reduced and hence, it is possible to provide the liquid crystal display device which can further enhance the yield factor.

The holding capacitance Cstg is formed in the following manner. First of all, the low-temperature polysilicon PSI of the thin film transistor is processed in an island shape. The low-temperature polysilicon PSI is connected to a vertical common electrode line CLMD via the fifth contact hole CNT5. On the other hand, a metal pixel electrode SPM which extends from a second contact hole CNT2 of the TFT formed of low-temperature silicon PSI extends over the low-temperature polysilicon PSI which constitutes the lower electrode of the holding capacitance Cstg. The holding capacitance is formed of overlapped area portions of the metal pixel electrode SPM and the low-temperature polysilicon PSI constituting the lower electrode of the holding capacitance Cstg which overlap each other by way of a gate insulating film and an interlayer insulating film. The transparent pixel electrode SPT is connected to the metal pixel electrode SPM via a third contact hole CNT3 and hence, a pixel potential is supplied to the liquid crystal. On the other hand, although a transparent common electrode line CLT is not connected to the vertical common electrode line CLMD within the screen, the transparent common electrode lines CLT are connected to each other outside the screen region so as to supply the common potential to the liquid crystal.

FIG. 20 is a cross-sectional view taken along a cut line 20-20' in FIG. 19. The drain voltage which constitutes the video signal is transmitted to the low-temperature polysilicon PSI from the drain line DL via the first contact hole CNT1. When the ON voltage is applied to the gate line GL, the MOS type TFT is operated and the video voltage is transmitted to the metal pixel electrode SPM which is connected to low-temperature polysilicon PSI via the second contact hole CNT2. Finally, the video voltage is transmitted to the transparent pixel electrode SPT which is connected to the metal pixel electrode SPM via the third contact hole CNT3 and forms the pixel potential which constitutes one potential of the liquid crystal capacitance. The common voltage which constitutes another potential for driving the liquid crystal is applied to the transparent common electrode line CLT. A new opening portion indicated by LR in FIG. 19 constitutes a new transmitting region which is formed by the lateral electric field applied to the transparent pixel electrode SPT and the transparent common electrode line CLT so that it is possible to provide the bright liquid crystal display device.

The lower electrode of the holding capacitance Cstg is constituted of the low-temperature polysilicon PSI ($n^+$) and the insulating film thereof is formed of a laminated film consisting of a gate insulating film GI and an interlayer insulating film ILI and hence, the insulation withstand voltage of the insulating film is higher than that of a single-layered film formed of the interlayer insulating film ILI of the holding capacitance of the embodiment 3. Accordingly, it is possible to provide the IPS type liquid crystal display device which has fewer point defects caused by the short-circuiting.

Embodiment 4

Figure 21:
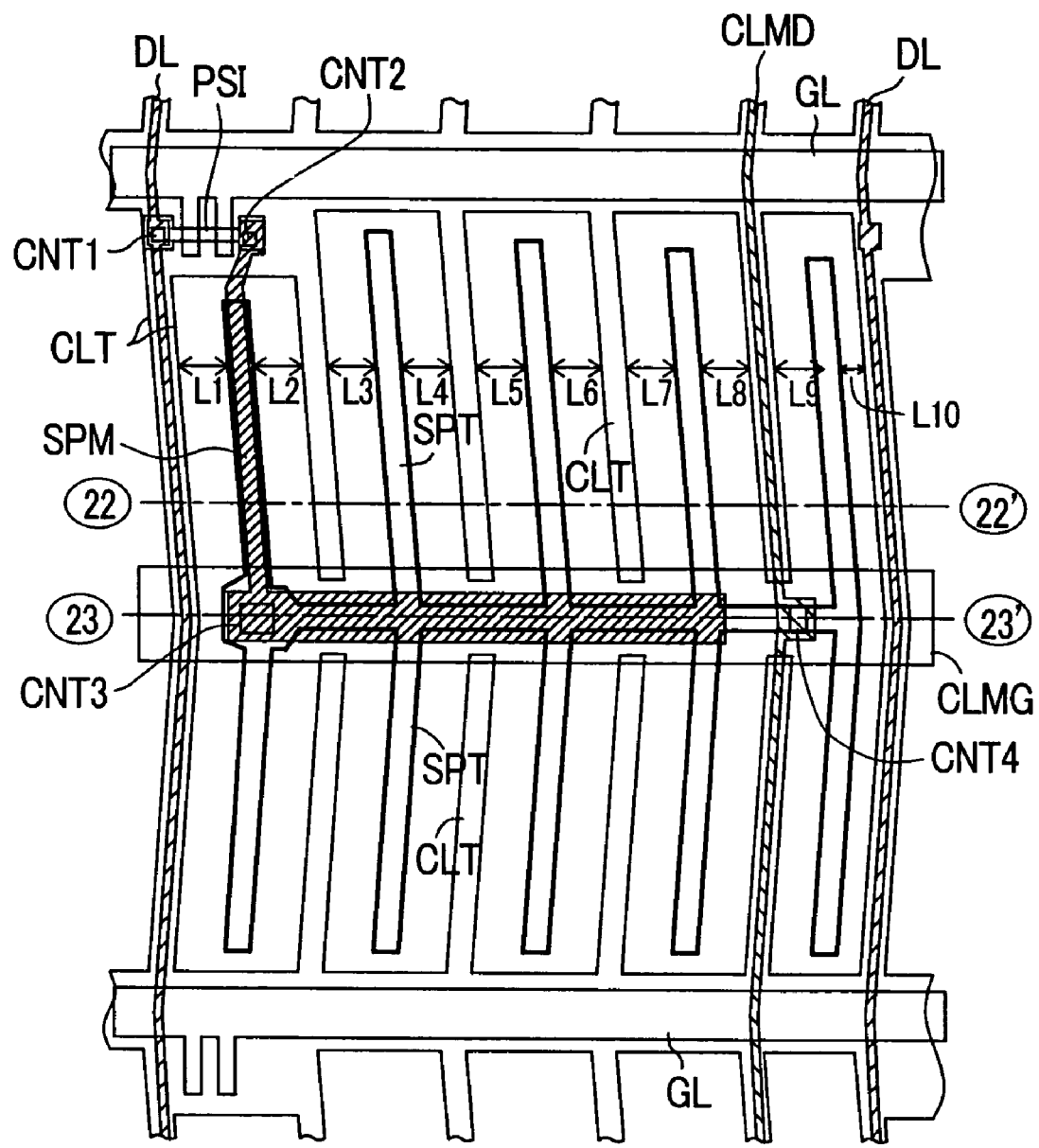
FIG. 21 is a plan view of a pixel of a TFT liquid crystal display device according to another embodiment of the present invention.
Figure 22:
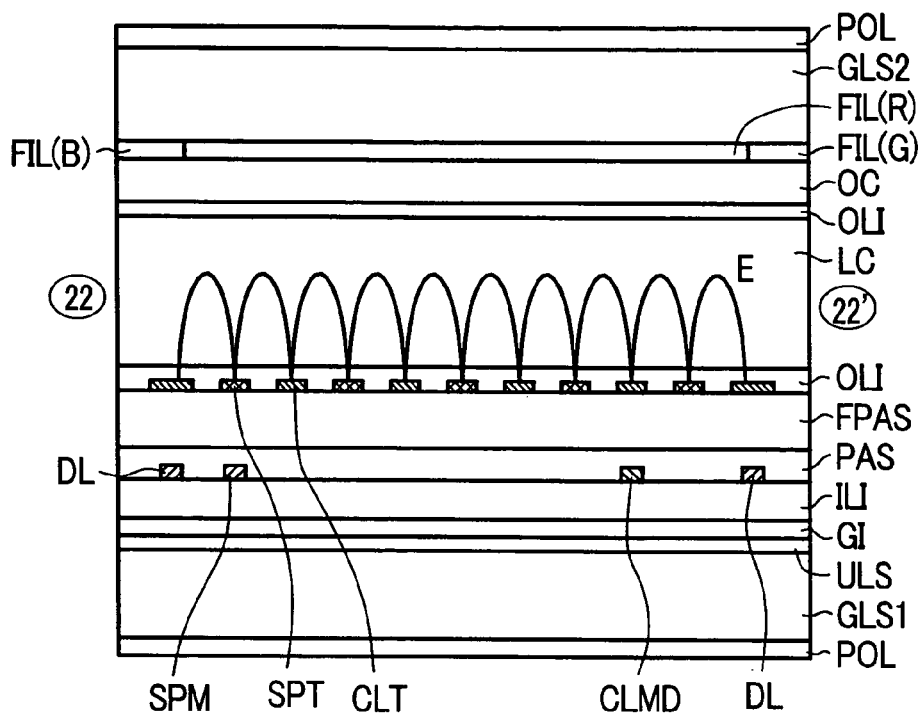
FIG. 22 is a cross-sectional view of an essential part taken along a line 22-22' in FIG. 21.
Figure 23:
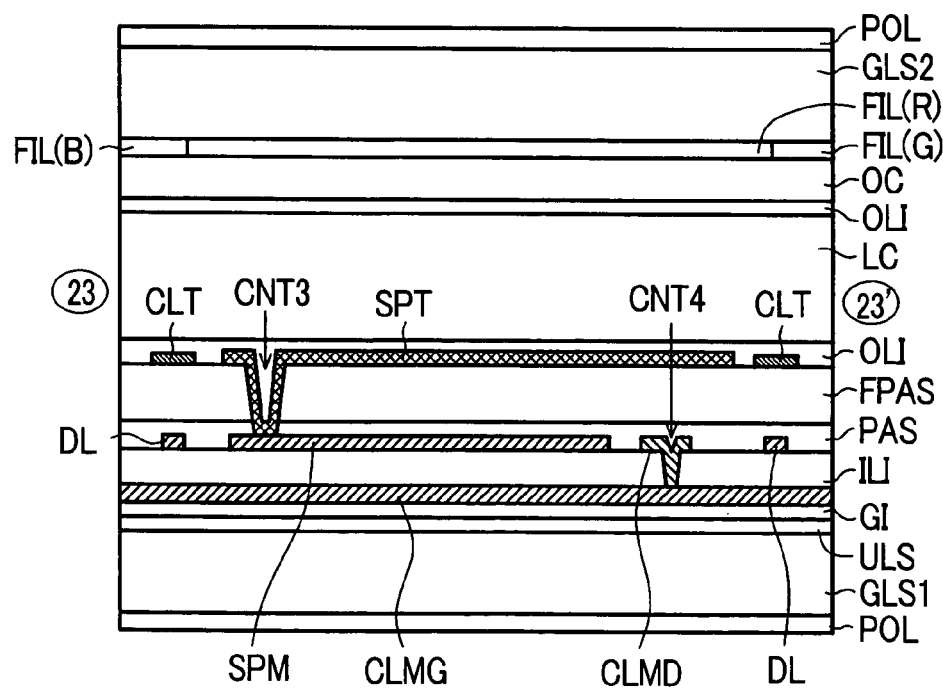
FIG. 23 is a cross-sectional view of an essential part taken along a line 23-23' in FIG. 21.

FIG. 21 is a plan view showing a pixel in the fourth embodiment and FIG. 22 and FIG. 23 are cross-sectional structural views taken along a line 22-22' and a line 23-23' taken in the plan view of FIG. 21.

The planar pattern of the pixel shown in FIG. 21 provides the constitution to enhance the numerical aperture with respect to a liquid crystal television set having a large one pixel size and a large screen size. The pixel shown in FIG. 21 has 10 transmitting regions in the lateral direction and respective sizes of distances between respective comb-teeth electrodes which are divided into 10 are indicated by L1, L2, L3, L4, L5, L6, L7, L8, L9, L10. The interval L between respective comb-teeth electrodes is substantially equal to that of the embodiment 1 shown in FIG. 1. This embodiment relates to the pixel pattern of the IPS liquid crystal display device which is suitable for a high-luminance type liquid crystal television set having a large screen. In a TFT using a low-temperature polysilicon PSI, as shown in FIG. 3, a backlight is arranged at a TFT glass substrate side and light of the backlight is directly irradiated to the low-temperature polysilicon PSI. Accordingly, there arises a drawback that a light irradiation leak current is increased and hence, a pixel potential is lowered. To cope with this drawback, it is necessary to increase the holding capacitance of one pixel and to reduce the wiring delay of common electrode lines which may be increased along with the increase of the holding capacitance.

With respect to the pixel shown in FIG. 21, in one pixel region which is surrounded by the neighboring drain lines DL and the neighboring gate lines GL, a vertical common electrode line CLMD which is formed by the same step and is formed of the same material as the drain lines DL is arranged below a transparent common electrode line CLT substantially parallel to the drain lines DL. Since a common potential is applied to the vertical common electrode line CLMD, with respect to the cross-sectional structure thereof, as shown in FIG. 22, it is necessary to arrange the vertical common electrode line CLMD below the transparent common electrode line CLT. This is because that when the vertical common electrode line CLMD is arranged below the transparent pixel electrode SPT, the video data defined by the pixel electrode SPT and the transparent common electrode line CLT is disturbed. Accordingly, it is necessary to arrange the vertical common electrode line CLMD in plane at the inside of the first transparent pixel electrode SPT counted from the drain line DL by at least one comb-tooth distance (L9 in FIG. 21). Further, the vertical common electrode line CLMD and the drain lines DL are formed by the same step and are formed of the same material in the manufacturing process and hence, they are liable to be easily short-circuited due to dust generated in the manufacturing step and the lines become defective when the short-circuiting occurs. From this viewpoint, it is advantageous to arrange the vertical common electrode line CLMD toward the inner side of the pixel from the drain line DL by way of two opening portions (L9, L10 in FIG. 21) in view of enhancing the yield factor.

The vertical common electrode line CLMD is connected to the lateral common electrode line CLMG via the fourth contact hole thus forming a metal matrix wiring on the screen and hence, even when the large holding capacitance is formed, it is possible to realize the screen display which exhibits the small wiring delay and the uniform display. In the plan view shown in FIG. 21, the holding capacitance is a capacitance which uses the metal pixel electrode SPM connected to the TFT portion formed of the low-temperature polysilicon PSI via the second contact hole CNT2 as the upper electrode and the lateral common electrode line CLMG as the lower electrode. Since the metal pixel electrode SPM and the vertical common electrode line CLMD are formed by the same step and are formed of the same material, they cannot cross each other. Accordingly, to obtain the holding capacitance of larger value, in the plan view of FIG. 21 and the cross-sectional view of FIG. 22, it is necessary to arrange the metal pixel electrode SPM below the comb-teeth transparent pixel electrode SPT close to the left-side drain line DL and to arrange the vertical common electrode line CLMD below the comb-teeth transparent common electrode line CLT close to the right-side drain line DL. Then, by arranging at least one or more transparent common electrode CLT or the transparent pixel electrode SPT between the metal pixel electrode SPM and the vertical common electrode line CLMD, it is possible to set the holding capacitance to a further larger value whereby it is possible to provide the IPS type liquid crystal display device which can be used in the application which requires the high luminance such as the liquid crystal television set. That is, it is possible to provide the IPS type liquid crystal display device which exhibits the high backlight luminance and also exhibits the least luminance irregularities, the least smear, the least image retention and the least flickers in applications which require the holding capacitance of a large value.

The above-mentioned arrangement can be realized (1) by separating the transmitting region of one pixel into 6 or more transmitting regions, (2) by arranging the metal pixel electrode SPM below the comb-teeth transparent pixel electrode SPT which is disposed closest to one drain line DL, (3) by arranging the vertical common electrode line CLMD at the other drain line DL side and below the transparent common electrode CLT different from a position above the drain line DL, and (4) by arranging at least one or more transparent common electrode CLT or the transparent pixel electrode SPT between the metal pixel electrode SPM and the vertical common electrode line CLMD. In this embodiment, as shown in FIG. 21 and FIG. 22, 10 transmitting regions are provided and 6 comb-teeth transparent electrodes are formed between the metal pixel electrode SPM and the vertical common electrode CLMD.

FIG. 23 is a cross sectional view taken along the lateral common electrode line CLMG and shows the cross-sectional structure of the holding capacitance. The holding capacitance is formed by using the metal pixel electrode SPM connected to the TFT formed of the low-temperature polysilicon PSI as an upper electrode, by using the lateral common electrode line CLMG as a lower electrode, and by using the interlayer insulating film ILI as the insulting film. The lateral common electrode line CLMG is connected to the vertical common electrode line CLMD below the protective film PAS via a fourth contact hole CNT4 so that the wiring delay time is reduced. Further, the potential of the metal pixel electrode SPM is transmitted to the transparent pixel electrode SPT over the organic protective film FPAS so as to drive the liquid crystal. As mentioned previously, the vertical common electrode line CLMD is arranged on the same layer as the metal pixel electrode SPM and hence, the vertical common electrode line CLMD is arranged at a position close to the right-side drain line DL whereby it is possible to increase the area of the metal pixel electrode SPM over the lateral common electrode line CLMG, that is, the holding capacitance.

Embodiment 5

Figure 24:
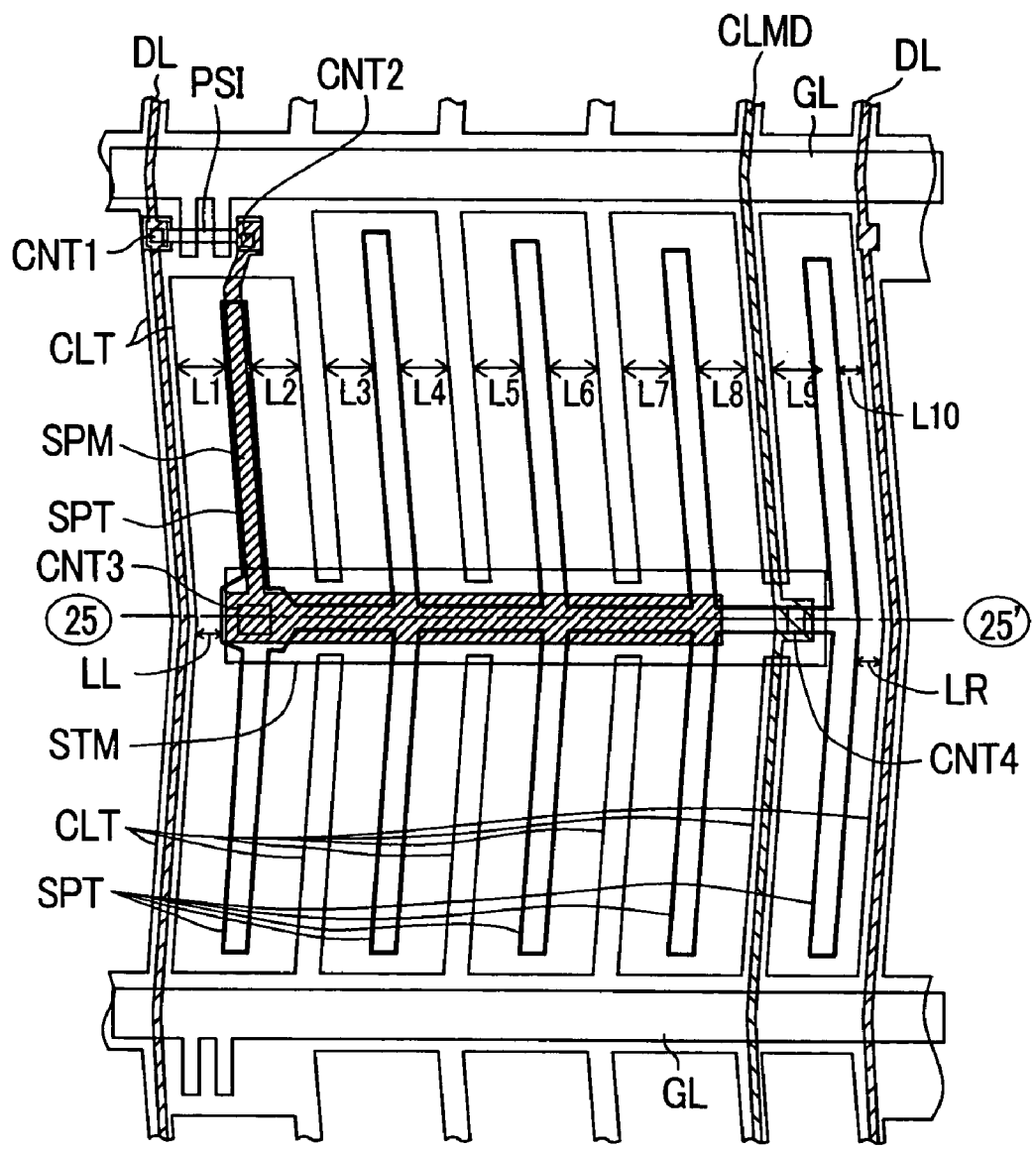
FIG. 24 is a plan view of a pixel of a TFT liquid crystal display device according to another embodiment of the present invention.

FIG. 24 is a plan view showing a pixel in the fifth embodiment of the present invention and FIG. 25 is a cross-sectional view taken along a line 25-25' taken in FIG. 24.

The planar pattern of the pixel shown in FIG. 24 is suitable for a liquid crystal television set having a large one pixel size and a large screen size. FIG. 24 has 10 transmitting regions and respective sizes of distances between respective comb-teeth electrodes which are divided into 10 are indicated by L1, L2, L3, L4, L5, L6, L7, L8, L9, L10. The interval L between respective comb-teeth electrodes is substantially equal to that of the embodiment 1 shown in FIG. 21. This embodiment, in the same manner as the embodiment 4, relates to the pixel pattern of the IPS liquid crystal display device which is suitable for a high-luminance type liquid crystal television set having a large screen. This pattern is also a pixel method in which when a circuit using the low-temperature silicon PSI is arranged on the TFT glass substrate GLS1, it is possible to make the maximum use of the driving ability of the circuit.

In the same manner as the case shown in FIG. 13 of the embodiment 1, the drain lines DL in the pixel region are connected to an external circuit IDC by way of a signal-side built-in circuit DDC on the TFT glass substrate GLS1. In the embodiment 1, three drain lines DL are connected to the outside by way of one drain terminal Td. Accordingly, compared to the liquid crystal display device adopting the amorphous silicon TFTs which does not incorporate the signal-side built-in circuit DDC on a glass substrate, the liquid crystal display device of this embodiment can reduce the number of drivers used in the external circuit IDC to one third and hence, the manufacturing cost can be reduced. On the other hand, in this case, since the drain lines DL have to write the video voltage spending time three times larger than time necessary for the liquid crystal display device adopting the amorphous silicon TFTs. Accordingly, it is necessary to reduce the wiring resistance and the capacitance of the drain lines DL.

As shown in FIG. 21 of the embodiment 4, the lateral common electrode line CLMG crosses the drain line DL by way of the insulating film and the parasitic capacitance of the drain line is formed at the crossing region. Accordingly, if the crossing region can be eliminated, the parasitic capacitance of the drain line can be reduced so that the delay time of the drain line can be reduced.

FIG. 24 is a plan view of one pixel which is provided for coping with the above-mentioned object. Between two drain lines DL which extend in the vertical direction, 10 transmitting regions (the distances being indicated by L1, L2, . . . L10) are provided. In the same manner as the embodiment 4, the metal pixel electrode SPM is arranged close to the left-side drain line DL where the TFT formed of the low-temperature polysilicon PSI is arranged. Further, the metal pixel electrode SPM is arranged below the transparent pixel electrode SPT which is sandwiched between the transmitting regions L1, L2. On the other hand, the vertical common electrode line CLMD is not formed over the right-side drain line DL but is arranged below the transparent common electrode CLT which constitutes the transparent common electrode CLT which is closest to the drain line DL and is sandwiched between the transmitting regions L8 and L9. Due to such an arrangement, in the IPS type liquid crystal display device having the pixel which has 6 or more divided transmitting regions, the holding capacitance can be maximized.

The holding capacitance has the following constitution as a planer pattern. That is, the holding capacitance electrode STM is formed using the same step and the same material as the gate lines GL. The holding capacitance electrode STM is not arranged to cross the drain line DL and hence, the delay time of the drain line can be reduced. The holding capacitance electrode STM constitute one electrode of the holding capacitance and is connected to the vertical common electrode line CLMD via the fourth contact hole CNT4 so that the common potential is applied to the holding capacitance electrode STM. The other electrode of the holding capacitance is, in the same manner as the embodiment 4, constituted of the metal pixel electrode SPM which extends from the second contact hole CNT2 of the low-temperature polysilicon PSI. Due to such a constitution, the crossing area portions of the holding capacitance electrode STM and the metal pixel electrode SPM constitute the holding capacitance.

In the pixel having the above-mentioned constitution, except for the gate lines GL, the holding capacitance lines which cross the drain lines DL are eliminated and hence, the drain line capacitance is reduced whereby the signal-side circuit on the TFT glass substrate GLS1 which drives the drain lines perform the favorable operation.

Further, as mentioned above, compared to the embodiment 4, the portions where the lateral common electrode line CLMG is eliminated (transmitting regions determined by distances LL, LR in the plan view of FIG. 24) form new transmitting regions so that it is possible to provide the brighter IPS type liquid crystal display device.

FIG. 25 shows the cross-sectional structure of the pixel. That is, FIG. 25 is a cross-sectional view showing the cross section traversing the neighboring drain lines DL and the holding capacitance electrode STM. The holding capacitance electrode STM which is formed by the same step and is formed of the same material as the gate line GL is arranged on the gate insulating film GI between the drain lines DL. The holding capacitance electrode STM is not extended below the drain line DL and hence, the capacitance is not formed. On the other hand, the vertical common electrode line CLMD which is formed by the same step and is formed of the same material as the drain line DL which is arranged over the interlayer insulating film ILI supplies the common potential to the holding capacitance electrode STM via the fourth contact hole CNT4 formed in the interlayer insulating film ILI. On the other hand, the pixel potential is supplied to the metal pixel electrode SPM from the TFT and, thereafter, the pixel potential is supplied to the transparent pixel electrode SPT via the third contact hole CNT3 formed in the organic protective film FPAS. The holding capacitance Cstg is formed using the above-mentioned metal pixel electrode SPM as the upper electrode, the interlayer insulating film ILI as the insulating film and the holding capacitance electrode STM as the lower electrode.

FIG. 25 shows the cross-sectional structure of new transmitting regions shown in the plan view of the pixel in FIG. 24. A driving voltage of the liquid crystal is supplied from the above-mentioned transparent pixel electrode SPT and the transparent common electrode CLT. The transparent common electrode CLT is not connected with the vertical common electrode line CLMD within the pixel as shown in FIG. 24. The transparent common electrode CLT is arranged over the organic protective film FPAS such that the transparent common electrode CLT also functions as a black matrix BM for the gate line GL. Further, the transparent common electrode CLT is arranged to cover the drain line DL so that the transparent common electrode CLT is arranged in a mesh pattern over the whole area of the pixel region. With respect to the supply of electricity to the transparent common electrode CLT, in the same manner as the transparent common electrode CLT shown in FIG. 13 of the embodiment 1, the transparent common electrode CLT is eventually connected to the common electrode bus line CLB outside the screen region on the TFT substrate GLS1 and the common potential is supplied to the transparent common electrode CLT from the external power supply circuit SCC. Due to the above-mentioned two transparent electrodes, the driving voltage of the liquid crystal is applied to the new transmitting regions having gaps LL, LR between the drain lines DL and the holding capacitance electrode STM so that it is possible to provide the bright IPS type liquid crystal display device.

Embodiment 6

Figure 26:
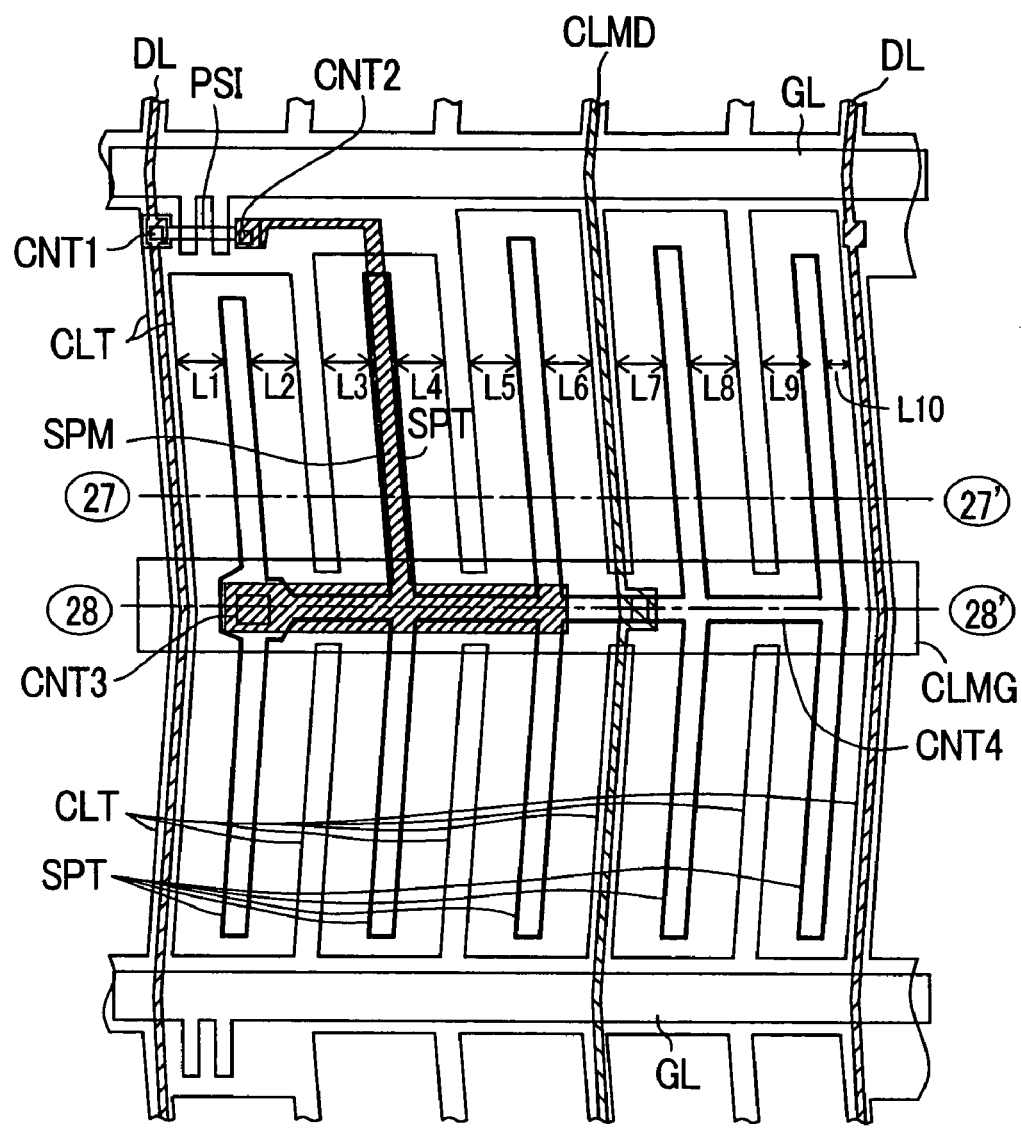
FIG. 26 is a plan view of a pixel of a TFT liquid crystal display device according to another embodiment of the present invention.
Figure 28:
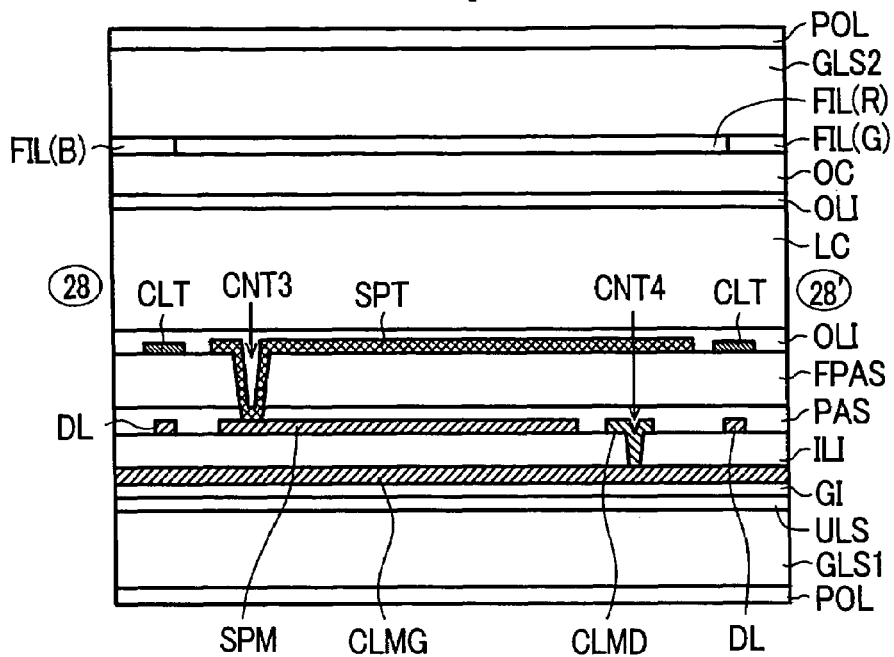
FIG. 28 is a cross-sectional view of an essential part taken along a line 28-28' in FIG. 26.

FIG. 26 is a plan view showing one pixel in the sixth embodiment of the present invention and FIG. 27 and FIG. 28 show the cross-sectional structures taken along a line 27-27' and a line 28-28' of FIG. 26.

The planar pattern of the pixel shown in FIG. 26 corresponds to a liquid crystal display television set having a large one pixel size and a large screen size. The pixel shown in FIG. 26 has 10 transmitting regions and respective sizes of distances between respective comb-teeth electrodes which are divided into ten are indicated by L1, L2, L3, L4, L5, L6, L7, L8, L9, L10. The interval L between respective comb-teeth electrodes is substantially equal to that of the embodiment 4 shown in FIG. 21. Although this embodiment relates to the pixel pattern of the IPS liquid crystal display device which is suitable for a high-luminance type liquid crystal television set having a large screen in the same manner as the embodiment 4, this embodiment realizes the liquid crystal display device which can reduce the occurrence of line defects and point defects on the screen.

FIG. 26 shows the pixel planar pattern which can reduce the line defects and the point defects which occur due to short circuiting between comb-teeth electrodes or electrode lines made of metal which are formed by the same step and are formed of the same material as the drain lines DL. In one pixel region which is sandwiched between the neighboring gate lines GL and between the neighboring drain lines DL, the metal pixel electrode SPM and the vertical common electrode line CLMD are formed by the same step and are formed of the same material as the drain lines DL. Here, the metal pixel electrode SPM extends from the second contact hole CNT2 of the TFT formed of the low-temperature polysilicon PSI to the lateral common electrode line CLMG and supplies the pixel potential to the transparent pixel electrode SPT via the third contact hole CNT3, and the vertical common electrode line CLMD extends in the vertical direction substantially parallel to the drain lines DL and is connected to the lateral common electrode line CLMG via the fourth contact hole CLMD so as to supply the common potential to the lateral common electrode line CLMG.

In the above-mentioned constitution, when the metal pixel electrode SPM is short-circuited with left-side drain line DL, a point defect occurs and when the vertical common electrode line CLMD is short-circuited with the drain line DL, a line defect occurs. Further, when the metal pixel electrode SPM and the vertical common electrode line CLMD are short-circuited with each other, a point defect occurs.

To reduce the short-circuiting defects which occur with a certain probability due to a foreign substance such as a minute dust or the like during the manufacturing process, it is necessary to shorten the length of the metal electrode or the line which faces in an opposed manner on the same plane or to elongate the distance between the electrodes which face in the opposed manner. When the distance between the electrodes which face in an opposed manner is short, the length of the metal electrodes or the lines which face in an opposed manner may be shortened.

In the pixel planar structure shown in FIG. 26, distances between the vertical common electrode line CLMD and the right-side drain line DL are formed by four transmitting regions L7, L8, L9, L10 and three transparent electrodes so that the probability of short-circuiting is reduced. On the other hands, the distances between the left-side drain line DL and the metal pixel electrode SPM are formed by three transmitting regions L1, L2, L3 and two transparent electrodes. Further, the distances between the metal pixel electrode SPM and the vertical common electrode line CLMD are formed by three transmitting regions L4, L5, L6 and two transparent electrodes. In this manner, the distances defined among the metal pixel electrode SPM, vertical common electrode line CLMD and drain lines DL sandwiched between the neighboring drain lines DL are arranged substantially equal with respect to the number of division of the pixel. Since the number of transmitting regions in respective distances is set to 4, 3, 3, the distances of the transmitting regions are not completely equal. However, when the sum of the transmitting regions is 10, it is safe to say that the distances are substantially equal with respect to the number of division. This is because that the number of division which is close to the completely uniform division next to the above-mentioned number of division of 4, 3, 3 is the number of division of 4, 4, 2 or 5, 3, 2. In both cases, the difference in number of transmitting regions amounts to two or more so that the difference of the number of division in respective distances is large compared to the case where the number of division is 4, 3, 3 with the difference of 1.

Further, when the transmitting regions are arranged with substantially equal distances with respect to the number of division of the pixel among the metal pixel electrode SPM, the vertical common electrode CLMD and the drain line DL between the neighboring drain lines DL, it is necessary that at least two transparent electrodes and three transmitting regions are arranged between the metal pixel electrode SPM and the neighboring drain line DL as well as between the metal pixel electrode SPM and the vertical common electrode line CLMD. For this end, it is necessary to set the number of division of the pixel to 8 or more. Accordingly, when the number of division of the pixel is 8, the distances can be divided to 3, 3, 2 so that the distances can be equally arranged with the difference of 1. Further, when the number of division of pixel is 12, by dividing the pixel with the number of division of 3, 5, 4, it is possible to substantially equally arrange the distances in the arrangement adopting 12 division. This is because that when the pixel is divided with the number of division of 4, 4, 4, the transparent pixel electrode SPT cannot be arranged below the metal pixel electrode SPM or when the pixel is divided with the number of division of 5, 5, 2, the difference is enlarged and hence, the division of 3, 5, 4 provides the equal values. In this manner, by realizing the substantially equal arrangement within the possible arrangement, the yield factor can be maximized. The advantageous effect on the enhancement of the yield factor due to the above-mentioned arrangement is not limited to the case of the above-mentioned drain lines, the metal pixel electrode and the vertical common electrode. Similar advantageous effects can be obtained by applying such an arrangement to any constitution of electrodes which are formed on the same layer in a spaced-apart manner.

For example, in the pixel constitution having 8 or more divided transmitting regions in which the metal vertical common line CLMD is provided between the neighboring drain line DL and the pixel potential is supplied to the metal pixel electrode SPM from the TFT, a pixel pattern which has two comb-teeth transparent electrodes between the metal electrodes and three transmitting regions between the metal electrodes can provide the IPS type liquid crystal display device which can minimize the occurrence of short circuiting defects between the metal electrodes. Although the distance between the metal pixel electrode SPM and the vertical common electrode CLMD and the distance between the metal pixel electrode SPM and the left-side drain line DL over the lateral common electrode line CLMG pattern are narrow, the length of the electrodes or lines which face in an opposed manner is a short value which does not extend over the pixel region and hence, the probability of short-circuiting in these portions is small.

FIG. 27 is a cross-sectional view between the neighboring drain lines. Over the interlayer insulating film ILI formed over the TFT glass substrate GLS1, the metal pixel electrode SPM and the vertical common electrode line CLMD are arranged between the drain lines DL. The drain lines DL, the metal pixel electrode SPM and the vertical common electrode line CLMD are arranged substantially with equal distances thus realizing the above-mentioned arrangement which makes the occurrence of the short-circuiting defects difficult. At least two or more transmitting regions are formed between respective electrodes or lines. Further, the metal pixel electrode SPM is covered with the transparent pixel electrode SPT by way of the organic protective film FPAS and a voltage which is equal to the voltage applied to the metal pixel electrode SPM is applied to the transparent pixel electrode SPT. The vertical common electrode line CLMD is covered with the transparent common electrode CLT by way of the organic protective film FPAS and a voltage which is equal to the voltage applied to the vertical common voltage line CLMD is applied to the transparent common electrode CLT. Due to such a constitution, it is possible to apply an electric field E to the liquid crystal without an error based on the applying voltage from respective comb-teeth transparent electrodes on the organic protective film FPAS.

FIG. 28 is a cross-sectional view taken along the lateral common electrode line CLMG. Over the TFT substrate GLS1, the lateral common electrode line CLMG which is formed by the same step as the gate lines GL is formed. The lateral common electrode line CLMG is connected to the vertical common electrode line CLMD via the fourth contact hole CNT4 formed in the interlayer insulating film ILI which covers the lateral common electrode line CLMG thus realizing the reduction of resistance. On the other hand, the metal pixel electrode SPM is connected to the transparent pixel electrode SPT via the third contact hole CNT3 formed in the organic protective film FPAS which is formed over the metal pixel electrode SPM. The organic protective film FPAS which covers the drain line DL is covered with the transparent common electrode CLT thus realizing the arrangement which prevents an erroneous operation caused by applying an undesired electric field of the drain line DL to the liquid crystal. The holding capacitance Cstg is constituted by using the lateral common electrode line CLMG as the lower electrode, the metal pixel electrode SPM as the upper electrode and the interlayer insulating film ILI as the insulating film.

Embodiment 7

Figure 29:
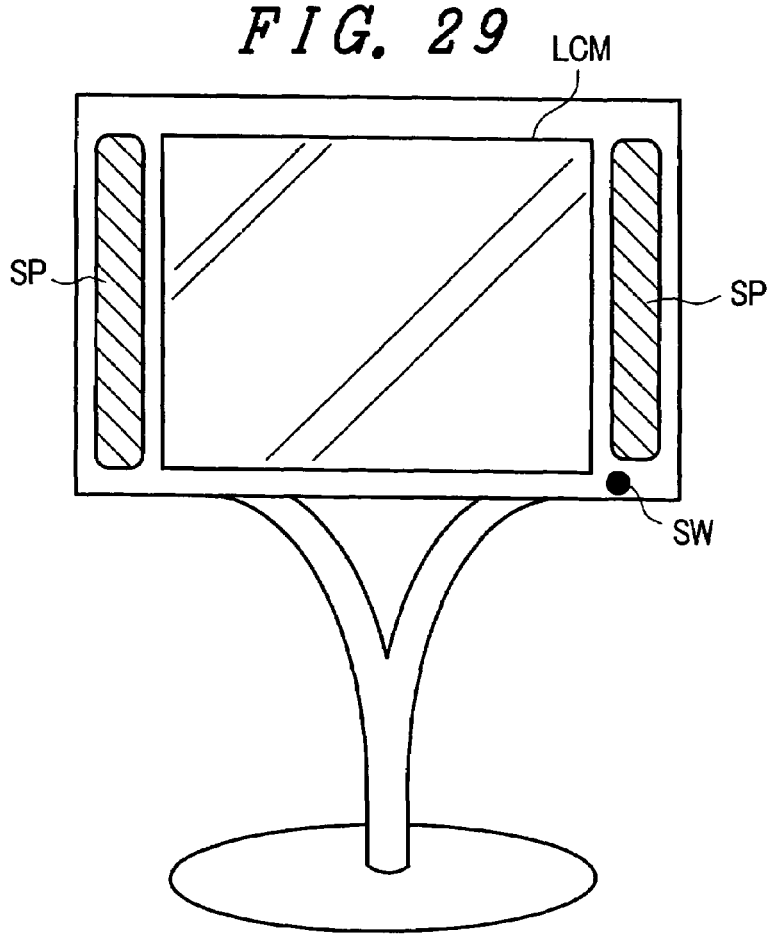
FIG. 29 is a schematic view of a liquid crystal television set to which the present invention is applied.

FIG. 29 shows an example in which a liquid crystal television set is constituted by mounting the liquid crystal display device to which any one of the embodiment 1 to embodiment 6 is applied thereon. The liquid crystal display device LCM arranged along with speakers SP thus realizing outputting of both of images and sound. Due to such a constitution, a display with a clear screen which exhibits the wide-viewing angle, the high luminance and the high contrast can be realized. Further, it is also possible to realize the display with the screen having the highly uniform luminance. Further, since the productivity is high and the yield factor is also high, it is possible to provide the liquid crystal TV set at a low price.

Embodiment 8

Figure 30:
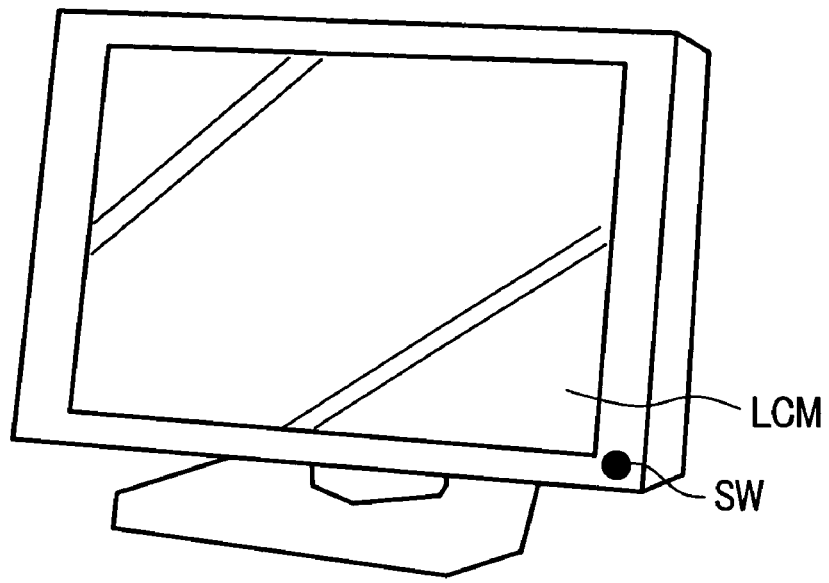
FIG. 30 is a schematic view of a liquid crystal monitor to which the present invention is applied.

FIG. 30 shows an example in which a liquid crystal monitor is constituted by mounting the liquid crystal display device to which any one of the embodiment 1 to embodiment 6 is applied thereon. The liquid crystal display device LCM displays information transmitted from a personal computer or the like thus realizing a monitor of low power consumption and high luminance. Due to such a constitution, a display with a clear screen which exhibits the wide-viewing angle, the high luminance and the high contrast can be realized. Further, it is also possible to realize the display with the screen having the highly uniform luminance. Further, since the productivity is high and the yield factor is also high, it is possible to provide the liquid crystal monitor at a low price.

Embodiment 9

Figure 31:
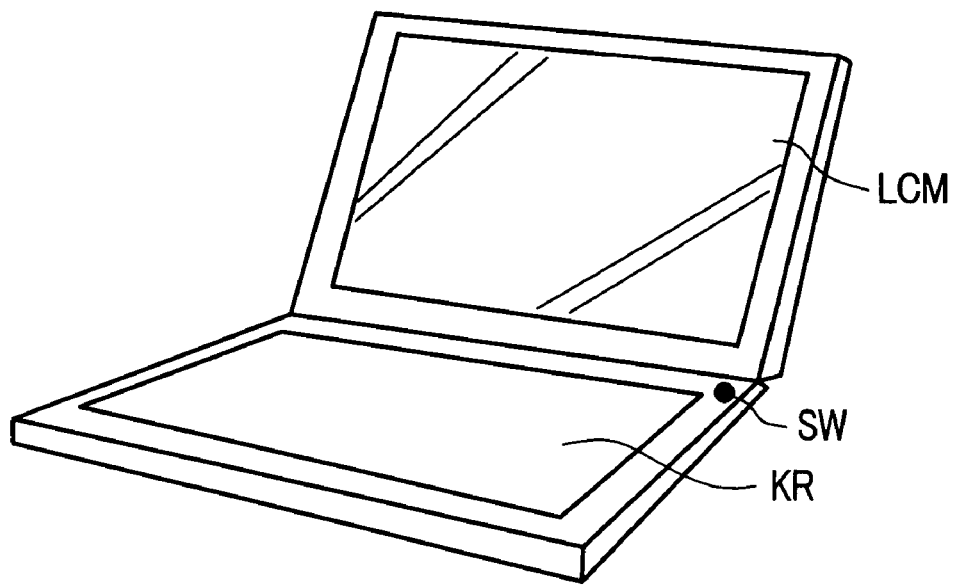
FIG. 31 is a schematic view of an integral type personal computer to which the present invention is applied.

FIG. 31 shows an example in which an integral type personal computer is constituted by mounting the liquid crystal display device to which any one of the embodiment 1 to embodiment 6 is applied thereon. The drawing shows a notebook type personal computer PC as an example of the integral type personal computer and a key board KB is also integrally constituted. It is needless to say that the integral type personal computer is not limited to such a personal computer and includes any liquid crystal personal computer which incorporates a liquid crystal part and an arithmetic operation part in the same casing. The liquid crystal display device LCM displays information transmitted from a personal computer or the like thus realizing a display of low power consumption and high luminance. Due to such a constitution, a display with a clear screen which exhibits the wide-viewing angle, the high luminance and the high contrast can be realized. Further, it is also possible to realize the display with the screen having the highly uniform luminance. Further, since the productivity is high and the yield factor is also high, it is possible to provide the integral type personal computer at a low price.

Embodiment 10

The embodiment realizes the stable display and the enhancement of the yield with the increase of the holding capacitance in a vertical electric field method, that is, in a TN method, a VA method, a PVA method, a MVA method, an OCB method, or an ASV method or the like with the use of the technical concept disclosed in any one of the embodiments 1 to 9. Here, all of the TN method, the VA method, the PVA method, the MVA method, the OCB method and the ASV method per se are known and the difference lies in the application of the technical concept disclosed in the embodiments of the present application to these methods.

The advantageous effects of the above-mentioned embodiments are not always limited to the lateral electric field type and even when the present invention is applied to the above-mentioned respective vertical electric field methods, it is possible to achieve the partial or the whole advantageous effects. In this case, the common electrode lines function as the holding capacitance lines and the common electrodes are formed on the CF substrate which faces the TFT substrate in place of the pixel electrodes on the TFT substrate.

The technical concepts disclosed in respective embodiments of the present application are within the range of disclosure of the specification of the present application provided that they are within the scope of the technical concepts.

As has been described heretofore in detail, according to the IPS display type liquid crystal display device of the present invention which is mainly constituted of low-temperature polysilicon TFTs, it is possible to provide the liquid crystal display device of high image quality and high reliability which exhibits the high luminance, the high stability to an environment, the high productivity, the high yield factor, the excellent luminance uniformity, the high contrast ratio, and the clear distinction between images.

What is claimed is:
1. A liquid crystal display device comprising:
a liquid crystal layer and a color filter layer sandwiched between a first transparent substrate and a second transparent substrate;
a plurality of gate lines, a plurality of drain lines which cross the plurality of gate lines in a matrix array and thin film transistors formed corresponding to respective crossing points of the gate lines and the drain lines on the first substrate;
pixel regions each of which is surrounded by the neighboring gate lines and the neighboring drain lines, each pixel includes at least a common electrode line and a pixel electrode,
wherein the liquid crystal display device comprising a first island-like electrode in the pixel region, includes an opening portion formed in a first insulating film which covers the first island-like electrode, includes a common electrode line which extends in the extending direction of the drain lines, wherein the first island-like electrode and the common electrode line are connected via the opening portion, the first island-like electrode constitutes a lower electrode, and a second island-like electrode which is connected to a source of the thin film transistor and is formed on the first insulating film constitutes an upper electrode thus forming holding capacitance.

2. A liquid crystal display device according to claim 1, wherein the liquid crystal display device includes common electrodes which are constituted over an insulating film which covers the drain line over the first substrate, the common electrodes are connected in a matrix array between neighboring pixels, and the common electrodes include portions which have a width wider than a width of the drain lines over an insulating film which are applied onto the drain lines.

3. A liquid crystal display device according to claim 1, wherein the insulating film of the holding capacitance is an inorganic insulating film which covers the gate line of the thin film transistor.

4. A liquid crystal display device according to claim 1, wherein the first island-like electrode is constituted of a semiconductor layer of the thin film transistor and the insulating film of the holding capacitance includes at least a gate insulating film of the thin film transistor.

* * * * *